United States Patent
Han

(10) Patent No.: US 11,930,197 B2
(45) Date of Patent: Mar. 12, 2024

(54) VIDEO DECODING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Cunai Han, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 320 days.

(21) Appl. No.: 17/377,370

(22) Filed: Jul. 15, 2021

(65) Prior Publication Data

US 2021/0344938 A1 Nov. 4, 2021

Related U.S. Application Data

(63) Continuation of application No. PCT/CN2020/094600, filed on Jun. 5, 2020.

(30) Foreign Application Priority Data

Jun. 12, 2019 (CN) .......................... 201910506089.1

(51) Int. Cl.
*H04N 19/42* (2014.01)
*H04N 19/105* (2014.01)
(Continued)

(52) U.S. Cl.
CPC ........... *H04N 19/42* (2014.11); *H04N 19/105* (2014.11); *H04N 19/136* (2014.11); *H04N 19/172* (2014.11)

(58) Field of Classification Search
CPC .. H04N 19/105; H04N 19/136; H04N 19/159; H04N 19/172; H04N 19/42; H04N 19/44; H04N 19/65
(Continued)

(56) References Cited

U.S. PATENT DOCUMENTS

2005/0030386 A1 2/2005 Kamieniecki
2010/0150238 A1* 6/2010 Watanabe ............ H04N 19/109
375/240.13
(Continued)

FOREIGN PATENT DOCUMENTS

CN 101677405 A * 3/2010 ............. H04N 19/40
CN 102685481 A 9/2012
(Continued)

OTHER PUBLICATIONS

The World Intellectual Property Organization (WIPO) International Search Report for PCT/CN2020/094600 dated Sep. 4, 2020 7 Pages (including translation).

*Primary Examiner* — Behrooz M Senfi
(74) *Attorney, Agent, or Firm* — ANOVA LAW GROUP, PLLC

(57) ABSTRACT

A video decoding method includes: obtaining target type information of a target video upon receiving a play instruction of the target video, the target type information indicating a type of the target video; obtaining specified type information of a plurality of decoders configured in a terminal, the specified type information of the decoders indicating types of videos of which decoding is supported by the decoders; and determining, from the plurality of decoders by comparing the specified type information of the plurality of decoders with the target type information, a
(Continued)

target decoder that supports decoding of the target video. The target video is decoded by using the target decoder to play a decoded video.

18 Claims, 10 Drawing Sheets

(51) Int. Cl.
*H04N 19/136* (2014.01)
*H04N 19/172* (2014.01)

(58) Field of Classification Search
USPC .................................................. 375/240.25
See application file for complete search history.

(56) References Cited

U.S. PATENT DOCUMENTS

2018/0199094 A1* 7/2018 Jeong .............. H04N 21/44004
2018/0278929 A1   9/2018 Jia

FOREIGN PATENT DOCUMENTS

| CN | 102761736 A | 10/2012 | |
|---|---|---|---|
| CN | 104581171 A | 4/2015 | |
| CN | 104780378 A | 7/2015 | |
| CN | 104954863 A * | 9/2015 | ........... H04N 21/434 |
| CN | 104954863 A | 9/2015 | |
| CN | 107172432 A | 9/2017 | |
| CN | 109889894 A | 6/2019 | |

* cited by examiner

VIDEO DECODING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2020/094600, entitled "VIDEO DECODING METHOD AND APPARATUS, COMPUTER DEVICE, AND STORAGE MEDIUM" and filed on Jun. 5, 2020, which claims priority to Chinese Patent Application No. 201910506089.1, entitled "VIDEO DECODING METHOD AND APPARATUS AND STORAGE MEDIUM" filed on Jun. 12, 2019, the entire contents of both of which are incorporated herein by reference.

FIELD OF THE TECHNOLOGY

The present disclosure relates to the field of computer technologies, and in particular, to a video decoding method and apparatus and a storage medium.

BACKGROUND OF THE DISCLOSURE

With the rapid development of video processing technologies and the gradual expansion of the data volume of videos, a video is usually encoded to reduce a data volume of the video. When the video needs to be played, an encoded video is decoded, and the decoded video is then played.

In the related art, a terminal is configured with one or more decoders for video decoding, and a decoder is selected from the one or more configured decoders as a default decoder. When the terminal needs to play an encoded target video, the default decoder is used to decode the target video to obtain a decoded video, and the decoded video is then played.

However, there are various video types, and the default decoder supports a limited quantity of video types. If the default decoder does not support the type of the target video, the default decoder fails to decode the target video, and the target video cannot be played, resulting in a low success rate of video decoding.

SUMMARY

Embodiments of the present disclosure provide a video decoding method and apparatus and a storage medium, which can improve a success rate of video decoding. The technical solutions are as follows:

According to an aspect, a video decoding method is provided, including: obtaining target type information of a target video upon receiving a play instruction of the target video, the target type information indicating a type of the target video; obtaining specified type information of a plurality of decoders configured in a terminal, the specified type information of the decoders indicating types of videos of which decoding is supported by the decoders; determining, from the plurality of decoders by comparing the specified type information of the plurality of decoders with the target type information, a target decoder that supports decoding of the target video; and decoding the target video by using the target decoder to play a decoded video.

According to another aspect, a video decoding apparatus is provided, including: a first obtaining module, configured to obtain target type information of a target video upon receiving a play instruction of the target video, the target type information indicating a type of the target video; a second obtaining module, configured to obtain specified type information of a plurality of decoders configured in a terminal, the specified type information of the decoders indicating types of videos of which decoding is supported by the decoders; a determining module, configured to determine, from the plurality of decoders by comparing the specified type information of the plurality of decoders with the target type information, a target decoder that supports decoding of the target video; a decoding module, configured to decode the target video by using the target decoder; and a playing module, configured to play a decoded video.

According to another aspect, a computer device is provided, including a processor and a memory, the memory storing at least one instruction, at least one program, a code set, or an instruction set (e.g., computer instructions), the instruction, the program, the code set, or the instruction set (e.g., computer instructions) being loaded and executed by the processor to implement: obtaining target type information of a target video upon receiving a play instruction of the target video, the target type information indicating a type of the target video; obtaining specified type information of a plurality of decoders configured in a terminal, the specified type information of the decoders indicating types of videos of which decoding is supported by the decoders; determining, from the plurality of decoders by comparing the specified type information of the plurality of decoders with the target type information, a target decoder that supports decoding of the target video; and decoding the target video by using the target decoder to play a decoded video.

According to another aspect, a non-transitory computer-readable storage medium is provided, storing at least one instruction, at least one program, a code set, or an instruction set (e.g., computer instructions), the instruction, the program, the code set, or the instruction set (e.g., computer instructions) being loaded and executed by a processor to implement operations performed in the video decoding method.

The embodiments of the present disclosure provide a video decoding method and apparatus and a storage medium. A target decoder that supports decoding of a target video may be selected by comparing specified type information of a plurality of decoders with target type information, and the target video is decoded by using the target decoder, so that decoding failure can be avoided, thereby improving a success rate of video decoding, and further improving a success rate of video playing.

In addition, an original video frame successfully decoded by a first target decoder is stored in a first buffer region, so that when decoding of a second original video frame fails subsequently, a second target decoder may decode a start video frame in the first buffer region without waiting for a next start video frame in the target video, thereby shortening a waiting time, preventing a terminal from entering a black screen state, and improving a playing effect of the target video.

Moreover, when decoding of any start video frame in the target video by using the first target decoder succeeds or fails, the start video frame is stored in the first buffer region. A storage space is saved as much as possible while ensuring a decoding effect, and a decoding speed of the second target decoder is increased.

BRIEF DESCRIPTION OF THE DRAWINGS

To describe technical solutions in embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make objectives, technical solutions, and advantages of the present disclosure clearer, the following further describes implementations of the present disclosure in detail with reference to the accompanying drawings.

It may be understood that the terms "first", "second", and the like used in the present disclosure may be used for describing various concepts in this specification. However, the concepts are not limited by the terms unless otherwise specified. The terms are merely used for distinguishing one concept from another concept. For example, without departing from the scope of the present disclosure, a first target decoder may be referred to as a second target decoder, and similarly, the second target decoder may be referred to as the first target decoder.

For the terms "at least one", "a plurality of", "each", and "any" used in the present disclosure, "at least one" includes one, two, or more, "a plurality of" includes two or more, "each" refers to each of "a plurality of corresponding ones", and "any" refers to any one of "a plurality of ones". For example, "a plurality of" target decoders include three target decoders, "each" refers to each of the three target decoders, and "any" refers to any one of the three target decoders, which may be the first one, the second one, or the third one.

Figure 1:
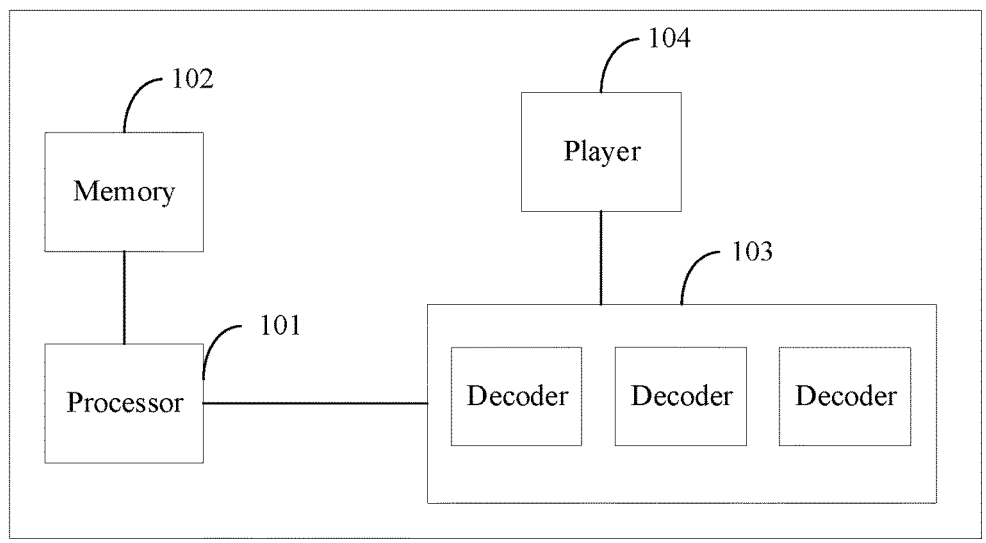
FIG. 1 is a schematic structural diagram of a terminal according to an embodiment of the present disclosure.

FIG. 1 is a schematic structural diagram of a terminal according to an embodiment of the present disclosure. The terminal may be an electronic device such as a smartphone, a tablet computer, a Moving Picture Experts Group Audio Layer III (MP3) player, a Moving Picture Experts Group Audio Layer IV (MP4) player, a notebook computer, a desktop computer, a head-mounted device, or any other smart terminal. Referring to FIG. 1, the terminal includes a processor 101, a memory 102, a plurality of decoders 103, and a player 104.

The processor 101 is configured to determine one decoder 103 from the plurality of decoders 103 configured in the terminal. The memory 102 includes a buffer region, and the buffer region is used for storing obtained videos. The plurality of decoders 103 are configured to: retrieve a video from the buffer region in the memory 102, decode the video, and transmit the decoded video to the player 104. The player 104 is configured to play the decoded video.

Therefore, after obtaining a target video to be played, the terminal stores the obtained target video in the buffer region in the memory 102. The processor 101 obtains specified type information of the plurality of decoders 103 configured in the terminal and target type information of the target video, selects, from the plurality of decoders 103, a decoder 103 that supports decoding of the target video, and controls the decoder 103 to retrieve the target video from the memory 102, decode the target video, and transmit the decoded video to the player 104. The player 104 plays the decoded video.

The plurality of decoders 103 configured in the terminal may include a MediaCodec (a decoding interface framework in the Android) decoder, a VideoToolBox (a decoding interface framework in the iOS) decoder, an AudioToolBox (a decoding interface framework in the iOS) decoder, an FFmpeg (a decoding interface framework) decoder, and the like.

The plurality of decoders 103 configured in the terminal may be classified into hardware decoders and software decoders according to types. The hardware decoder is a decoder configured when the terminal leaves the factory, and the hardware decoder runs in a graphics processing unit (GPU) in the terminal. The software decoder runs in a central processing unit (CPU) in the terminal.

Figure 2:
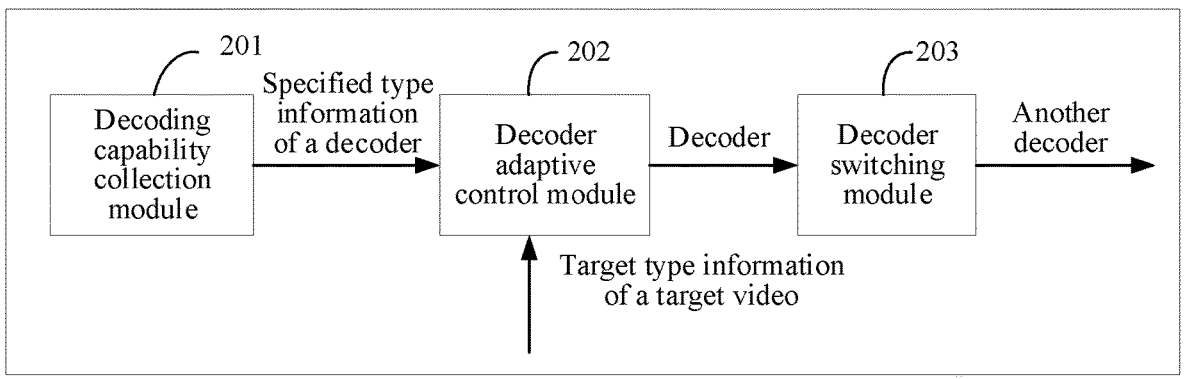
FIG. 2 is a schematic structural diagram of another terminal according to an embodiment of the present disclosure.

FIG. 2 is a schematic structural diagram of another terminal according to an embodiment of the present disclosure. Referring to FIG. 2, the processor 101 includes a decoding capability collection module 201, a decoder adaptive control module 202, and a decoder switching module 203.

The decoding capability collection module 201 is configured to obtain specified type information of the decoder to use the specified type information to represent a decoding capability of the decoder.

The decoder adaptive control module 202 is configured to analyze, according to the specified type information provided by the decoding capability collection module 201, video types of which decoding is supported by the plurality of decoders, select, from the plurality of decoders, a decoder that supports decoding of a target video, and control the decoder to decode the target video.

The decoder switching module 203 is configured to: switch from a currently used decoder to another decoder when decoding using any decoder fails, and control the another decoder for decoding, to implement switching between decoders.

In one embodiment of the present disclosure, an example in which a terminal performs a video decoding method is merely used for description. In another embodiment, the video decoding method may be performed by a server, or may be performed together by a server and a terminal that interact with each other. For example, when a play instruction of a target video is received, the server determines, according to target type information of the target video and specified type information of a plurality of decoders, a target decoder that supports decoding of a target video on the terminal, and the terminal decodes the target video by using the target decoder determined by the server and plays the decoded video.

The method provided in the embodiments of the present disclosure is applied to any scenario of video playing.

For example, in a scenario of online video playing, the terminal receives a video transmitted by a video server, decodes the video by using the video decoding method provided in the embodiments of the present disclosure, and plays the decoded video, and a user can watch the video online.

Alternatively, in a scenario of offline video playing, the terminal downloads a video from the server and stores the video in the terminal, and when a user opens the video, the terminal decodes the video by using the video decoding method provided in the embodiments of the present disclosure, and plays the decoded video.

Alternatively, the method provided in the embodiments of the present disclosure may be applied to other scenarios. Details are not described herein again.

Figure 3:
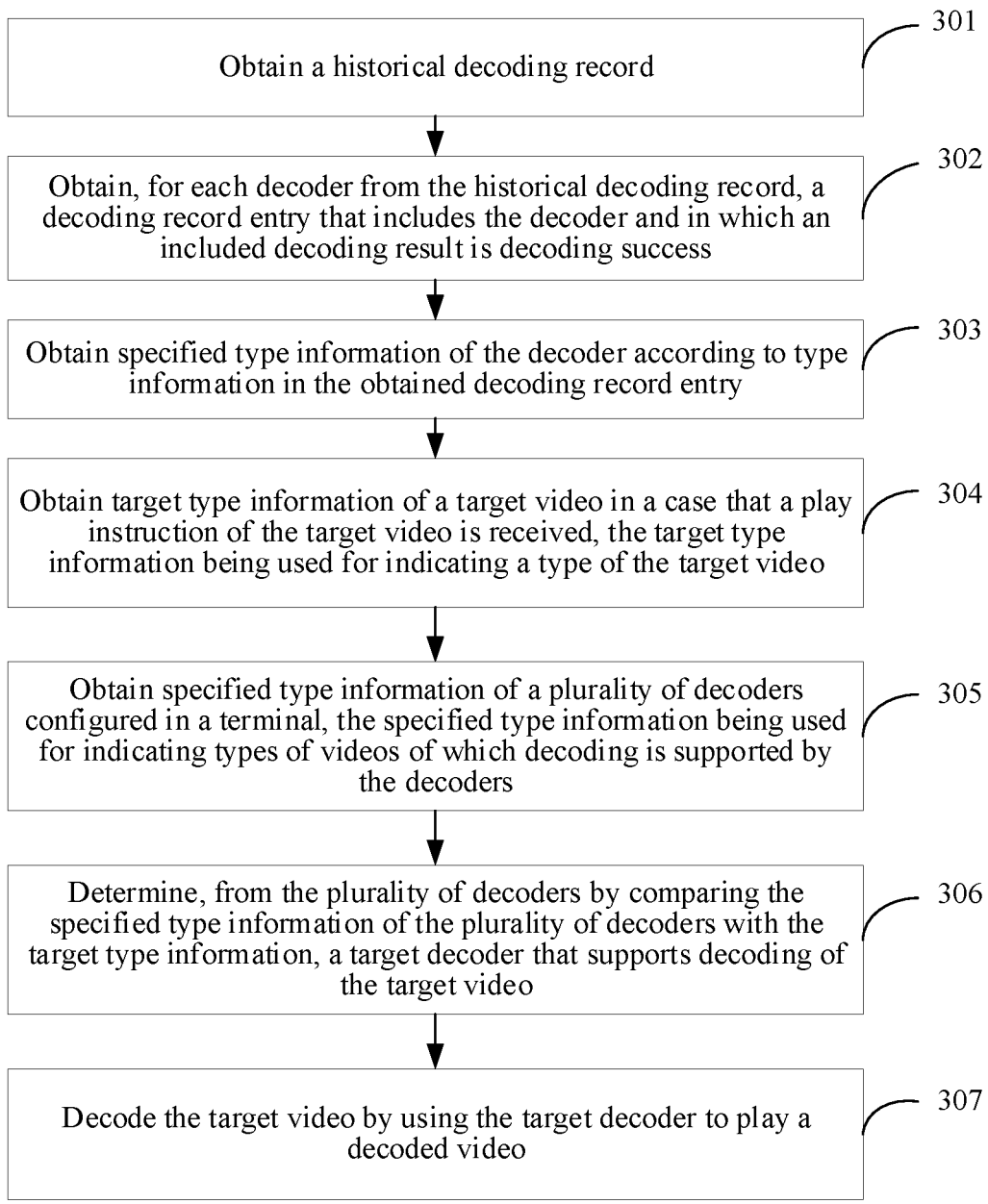
FIG. 3 is a flowchart of a video decoding method according to an embodiment of the present disclosure.

FIG. 3 is a flowchart of a video decoding method according to an embodiment of the present disclosure. The method is applied to a terminal. Referring to FIG. 3, the method includes the following steps:

301: Obtain a historical decoding record.

To reduce the data volume of videos to further reduce an occupied storage space and network resources consumed during transmission, a video is usually encoded first to obtain an encoded video. Subsequently, the encoded video may be decoded by using a decoder to play the decoded video.

However, the terminal is configured with a plurality of decoders, and different decoders support decoding of different video types. That is, different decoders have different compatibility with videos. To avoid the case that, when decoding a video, a decoder does not support decoding of the video and as a result decoding fails, an embodiment of the present disclosure provides a solution for adaptively determining a decoder, so that a target decoder that supports decoding of a video to be played can be selected according to video types of which decoding is supported by a plurality of decoders and a video type of the video to be played, thereby improving a success rate of video decoding.

To determine a video type of which decoding is supported by each decoder, a historical decoding record of the terminal is first obtained. Specified type information of the decoder is determined according to the historical decoding record. The specified type information is used for indicating types of videos of which decoding is supported by the decoders, and may represent a decoding capability of the decoder.

The historical decoding record includes at least one decoding record entry. Each decoding record entry includes type information of a decoded video and a correspondence between a decoder that decodes the video and a decoding result.

A generation method of the historical decoding record is as follows: When the terminal uses any one of the plurality of configured decoders to decode any video, type information of the video is obtained, a decoder that performs decoding a current time is determined, and a decoding result obtained by the decoder by decoding the video is determined. The decoding result includes decoding success or decoding failure. The decoding success represents that the decoder supports decoding of the video, and the decoding failure represents that the decoder does not support decoding of the video. Next, the terminal generates a decoding record entry. The decoding record entry includes type information of a video, a decoder that decodes the video, and a decoding result, which are added to the historical decoding record.

The type information of a video is used for indicating a type of the video, and may include a resolution, an encoding format, an encryption type, a rotation type, and the like.

1. A resolution is an intuitive expression of a data volume of video frames in a video, and is used for representing the quantity of pixels included in the video frames in the video. When the resolution of the video is higher, the data volume is larger.

2. An encoding format is a format used to encode a video. The encoding format includes H264 (an encoding standard), H265 (an encoding standard), and the like.

3. For an encryption type, videos may be classified into encrypted videos and non-encrypted videos. For example, a video may be a video encrypted by using a Digital Rights Management (DRM) technology.

4. For a rotation type, videos may be classified into videos that need to be rotated during decoding and videos that do not need to be rotated during decoding. If a video is rotated during encoding, reverse rotation is required during decoding to restore the original video to ensure normal playing of the video. If a video is not rotated during encoding, the rotation is not required during decoding.

For example, the historical decoding record may be shown in Table 1:

TABLE 1

| Type information of a video | | | | |
|---|---|---|---|---|
| Resolution | Encoding format | Rotation type | Decoder | Decoding result |
| 1080p | H264 | Rotation needed | Decoder 1 | Succeed |
| 1080p | H264 | Rotation needed | Decoder 2 | Fail |
| 720p | H265 | Rotation not needed | Decoder 3 | Succeed |

The specified type information may include a resolution, an encoding format, an encryption type, a rotation type, and the like.

1. A resolution is a resolution of a video of which decoding is supported by a decoder. If a resolution of a video is lower than or equal to the resolution, the decoder supports decoding of the video. If a resolution of a video is higher than the resolution, the video cannot be played normally when the decoder decodes the video, and as a result the decoder does not support decoding of the video.

2. An encoding format is an encoding format of a video of which decoding is supported by a decoder. If an encoding format of a video is the encoding format of the video of which decoding is supported by the decoder, the decoder supports decoding of the video. If an encoding format of a video is not the encoding format of the video of which decoding is supported by the decoder, the decoder does not support decoding of the video.

Different decoders support different encoding formats. For example, for a terminal installed with the Android, a hardware decoder configured in the terminal can only support decoding of a video with an encoding format of H264, and for a terminal installed with the iOS, VideoToolBox (a decoding interface framework in the iOS) in the terminal can only support decoding of a video with an encoding format of H264.

3. An encryption type refers to whether a decoder supports an encrypted video.

For example, if a video is a video encrypted by using a DRM technology, a hardware decoder supports decoding of a DRM video.

4. A rotation type refers to whether a decoder performs rotation during decoding.

For example, if a video is rotated during encoding, a software decoder supports decoding of the video.

302: Obtain, for each decoder from the historical decoding record, a decoding record entry that includes the decoder and in which an included decoding result is decoding success.

For each decoding record entry in the historical decoding record, if the decoding result in the decoding record entry is decoding success, it indicates that the decoder in the decoding record entry supports decoding of a video that meets type information in the decoding record entry. If the decoding result in the decoding record entry is decoding failure, it indicates that the decoder in the decoding record entry does not support decoding of a video that meets type information in the decoding record entry.

Therefore, for each decoder, at least one decoding record entry that includes the decoder and in which the included decoding result is decoding success is obtained from the historical decoding record. The type information included in the plurality of decoding record entries is the type information of the video of which decoding is supported by the decoder.

303: Obtain specified type information of the decoder according to type information in the obtained decoding record entry.

If there is one decoding record entry obtained in step 302, the type information in the decoding record entry is obtained, and the type information is used as the specified type information of the decoder.

If there are a plurality of decoding record entries obtained in step 302, the type information of each decoding record entry in the plurality of decoding record entries is obtained, a plurality of pieces of obtained type information are combined, and the combined type information is used as the specified type information of the decoder.

Each video may include a plurality of items of type information, and each decoding record entry may include a plurality of items of type information. When the type information in a plurality of decoding record entries is obtained, the type information belonging to the same item in the plurality of pieces of type information is combined to obtain a union of the type information belonging to the same item to further obtain a plurality of unions, and the plurality of obtained unions are used as the specified type information.

For example, if resolutions obtained in four decoding record entries are 720p, 1080p, 720p, and 1080p respectively, a union obtained by combination is {720p, 1080p}, and it is determined that resolutions in specified type information are {720p, 1080p}.

In a first aspect, in one embodiment of the present disclosure, an example in which the specified type information is obtained according to the historical decoding record of the terminal is merely used for description. In another embodiment, because a playing result of a video can indicate whether the decoder supports decoding of the video, the specified type information of the decoder may be obtained according to a historical playing record.

Therefore, the obtaining the specified type information includes: obtaining a historical playing record, the historical playing record including at least one playing record entry, each playing record entry including type information of a played video and a correspondence between a decoder that decodes the video before playing and a playing result, the playing result including playing success or playing failure; obtaining, for each decoder from the historical playing record, a playing record entry that includes the decoder and in which an included playing result is playing success; and combining the obtained type information in the playing record entry to obtain the specified type information of the decoder.

A process of obtaining the specified type information according to the historical playing record is similar to a process of obtaining the specified type information according to the historical decoding record, and details are not described herein again.

In a second aspect, steps 301 to 303 in one embodiment of the present disclosure are optional steps. In another embodiment, a process of obtaining the specified type information of the decoder by the terminal may include the following process:

In one embodiment, a test terminal is configured with a plurality of decoders, the test terminal obtains a plurality of sample videos and type information of the plurality of sample videos, for each decoder in the test terminal, the plurality of sample videos are decoded by using the decoder, at least one sample video supported by the decoder is determined according to a decoding result, the type information of the at least one sample video is combined to obtain specified type information of the decoder, the obtained specified type information of the decoder is transmitted to a server, the server correspondingly stores the decoder and the specified type information of the decoder, and the terminal may obtain, from the server, the specified type information of any one or more decoders configured in the terminal.

In another embodiment, a test terminal is configured with a plurality of decoders, the test terminal obtains a plurality of sample videos and type information of the plurality of sample videos, for each decoder in the test terminal, the plurality of sample videos are decoded by using the decoder, at least one sample video successfully decoded by the decoder is determined according to a decoding result, the at least one sample video successfully decoded is played, at least one sample video successfully played is determined according to a playing result, the determined at least one sample video is used as the sample video supported by the decoder, the type information of the at least one sample video is combined to obtain specified type information of the decoder, the obtained specified type information of the decoder is transmitted to a server, the server correspondingly stores the decoder and the specified type information of the decoder, and the terminal may obtain, from the server, the specified type information of any one or more decoders configured in the terminal.

After obtaining the specified type information of configured each decoder, the terminal stores the specified type information of the each decoder.

304: Obtain target type information of a target video upon receiving a play instruction of the target video, the target type information indicating a type of the target video.

The target video may be any video, and the target video is an encoded video. When the play instruction of the target video is received, the target video needs to be decoded first, and the decoded video is then played. Before decoding, a decoder that supports decoding of the target video needs to be selected.

Therefore, the type information of the target video is obtained as the target type information, and the target type information is used for indicating a type of the target video and may include a resolution, an encoding format, an encryption type, a rotation type, and the like. Subsequently, the decoder that supports decoding of the target video may be determined according to the target type information of the target video and the specified type information of each decoder. One embodiment of the present disclosure can be applied to a scenario of online playing of the target video.

The server stores a plurality of videos, and each video has identification information. The terminal displays the identification information of the plurality of videos provided by the server. A trigger operation may be performed on the identification information of the target video when a user intends to play the target video. The trigger operation may be a click/tap operation, a long press operation, or another operation. When detecting the trigger operation on the identification information of the target video, the terminal determines that the play instruction of the target video is received, and transmits the play instruction to the server. The play instruction carries the identification information of the target video. The server determines the target video according to the identification information, and transmits the target video to the terminal. The terminal receives the target video transmitted by the server, the target video including type information, and then obtains the type information from the target video as the target type information.

In some embodiments, the server may determine the target video according to the identification information and transmit the target video and the type information of the target video to the terminal, and the terminal receives the target video and the type information of the target video and uses the type information as the target type information.

Another embodiment of the present disclosure can be applied to a scenario of offline playing of the target video.

The terminal stores a plurality of videos, and may display any one or more stored videos. If the user intends to play the target video, a trigger operation may be performed on the target video. The trigger operation may be a click/tap operation, a long press operation, or another operation. When detecting the trigger operation on the target video, the terminal determines that the play instruction of the target video is received, and obtains the type information from the target video as the target type information.

In some embodiments, when detecting the trigger operation on the target video, the terminal determines that the play instruction of the target video is received, and obtains the type information of the target video as the target type information.

305: Obtain specified type information of a plurality of decoders configured in a terminal (e.g., the test terminal), the specified type information indicating types of videos of which decoding is supported by the decoders.

In the foregoing steps 301 to 303, the terminal obtains and stores the specified type information of the plurality of decoders. Next, in step 305, the terminal may directly obtain the specified type information of the plurality of decoders.

306: Determine, from the plurality of decoders by comparing the specified type information of the plurality of decoders with the target type information, a target decoder that supports decoding of the target video.

For each decoder of the plurality of decoders, the specified type information of the decoder is compared with the target type information to determine whether the specified type information and the target type information match. If the specified type information matches the target type information, it is determined that the decoder supports decoding of the target video, and the decoder is used as the target decoder.

The foregoing steps are repeated for each decoder, so that one or more target decoders that support decoding of the target video may be determined from the plurality of decoders.

In some embodiments, considering that the target type information may include a plurality of items of type information that may be matched item by item. That is, for each decoder of the plurality of decoders, the plurality of items of type information in the specified type information and the plurality of items of type information in the target type information are obtained, and it is determined whether each item of type information in the specified type information matches the type information belonging to the same item in the target type information. If each item of type information in the specified type information matches the type information belonging to the same item in the target type information, it is determined that the decoder supports decoding of the target video, and the decoder is used as the target decoder.

Figure 4:
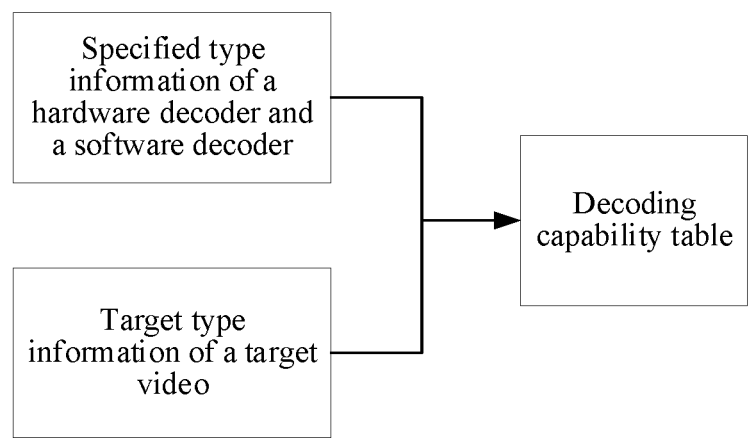
FIG. 4 is a schematic diagram of constructing a decoding capability table according to an embodiment of the present disclosure.

For example, as shown in FIG. 4, to intuitively determine whether a hardware decoder and a software decoder support decoding of the target video, a decoding capability table is constructed according to the specified type information of the hardware decoder and the software decoder and the target type information of the target video. The decoding capability table includes a plurality of items of type information in the target type information. It is determined whether the hardware decoder and the software decoder support each item of type information, and an obtained result of the determination is filled into the decoding capability table, and the decoding capability table shown in Table 2 is obtained through item-by-item comparison. It may be intuitively seen, according to the decoding capability table, whether the hardware decoder and the software decoder support decoding of the target video.

TABLE 2

| Target type information | Does a hardware decoder support decoding? | Does a software decoder support decoding? |
|---|---|---|
| Resolution (1280*720) | Yes | Yes |
| Encoding format (H264) | Yes | Yes |
| Rotation needed | No | Yes |

In one embodiment, the terminal presets a matching rule for the type information, and may determine, according to the matching rule, whether the specified type information matches the target type information. For example, the matching rule stipulates that an encrypted video can only be decoded by a hardware decoder. Therefore, if an encryption type in the target type information is encryption, it indicates that the target video is an encrypted video, and it is only determined that the specified type information of the hardware decoder matches the target type information, to ensure that only the hardware decoder is used to decode the target video.

In one embodiment, if the plurality of target decoders that support decoding of the target video are determined from the plurality of decoders, a target decoder with the highest priority is selected from the plurality of target decoders according to priorities of the plurality of target decoders.

The priority is used for indicating a priority degree of a decoder. For example, if the determined target decoders are a decoder A, a decoder B, and a decoder C and the priorities of the decoder A, the decoder B, and the decoder C sequentially decrease, the decoder A is selected.

In some embodiments, a method for determining a priority of a decoder includes at least one of the following:

1. A priority is determined according to an amount of memory occupied by the decoder during decoding. A higher priority is determined for a decoder that occupies less memory, and a lower priority is determined for a decoder that occupies more memory.

For example, decoders are classified into hardware decoders and software decoders. Memory occupied by a hardware decoder is less than memory occupied by a software decoder. A priority of the hardware decoder is set higher than a priority of the software decoder.

2. A priority is determined according to a resolution in decoding supported by the decoder. A higher priority is determined for a decoder that supports a higher resolution, and a lower priority is determined for a decoder that supports a lower resolution. According to a priority, a target decoder that supports a higher resolution can be selected as much as possible, and a high-definition video can be obtained by using the target decoder for decoding.

3. A priority is determined according to complexity of an encoding format of which decoding is supported by the decoder. A higher priority is determined for a decoder that supports a complex encoding format, and a lower priority is determined for a decoder that supports a simple encoding format. According to the priority, a target decoder that supports a complex encoding format can be selected as much as possible.

In another embodiment, a level of a user identifier currently logged in is obtained; a plurality of decoders matching the level are selected from the plurality of decoders; and the target decoder is determined by comparing the specified type information of the plurality of decoders matching the level with the target type information.

The user identifier is used for determining a unique corresponding user, and the user identifier has a level to which the user identifier belongs. The levels of different user identifiers may be the same or different.

In addition, the terminal sets a matching decoder for each level to indicate that a matching decoder is used to provide a decoding service to the user identifier with the corresponding level, so as to implement personalized services for users with different levels. When a level is higher, a matching decoder has a higher decoding capability, and when a level is lower, a matching decoder has a lower decoding capability. For example, when a level is higher, a matching decoder is a decoder that supports a higher resolution, and when a level is lower, a matching decoder is a decoder that supports a lower resolution.

Therefore, according to a level of a user identifier currently logged in on the terminal, a plurality of decoders matching the level of the user identifier are selected from a plurality of decoders, a target decoder that supports decoding of the target video is then determined from the plurality of selected decoders by comparing specified type information of each decoder with target type information of the target video.

This embodiment of the present disclosure provides an upper service logic policy, so that decoder matching can be performed according to various methods such as a matching rule, a priority of the decoder, or the level of the user identifier, to select a target decoder that meets requirements and decode a target video. The flexibility is improved by configuring the upper service logic policy. That is, this embodiment of the present disclosure provides a method for adaptively selecting a target decoder. Instead of directly using a default decoder to decode a target video, specified type information of a plurality of decoders is compared with target type information to select a target decoder that supports decoding of the target video.

In one embodiment of the present disclosure, an example in which steps 301 to 306 are performed by a terminal is used for description. In another embodiment, a server may be used to perform the foregoing steps 301 to 306, to determine a target decoder that supports decoding of a target video, and transmit the determined target decoder to a terminal, and the terminal performs subsequent steps according to the determined target decoder.

307: Decode the target video by using the target decoder to play a decoded video.

The target video includes a plurality of original video frames. In a process of decoding the target video by using the target decoder, any original video frame in the target video is decoded by using the target decoder to obtain a decoded video frame corresponding to the original video frame, and the decoded video frame is played, and a next original video frame in the target video is then decoded to obtain a next decoded video frame, and the next decoded video frame is played. By analogy, the original video frames in the target video may be decoded and played sequentially. Because the target decoder is a decoder that supports decoding of the target video, the target video is decoded by using the target decoder, so that decoding failure can be avoided, thereby improving a success rate of video decoding, and further improving a success rate of video playing.

In the method provided by one embodiment of the present disclosure, target type information of a target video and specified type information of a plurality of decoders configured in a terminal are obtained, the target type information is used for indicating a type of the target video, the specified type information is used for indicating types of videos of which decoding is supported by the decoders, a target decoder that supports decoding of the target video is determined from the plurality of decoders by comparing the specified type information of the plurality of decoders with the target type information, and the target video is decoded by using the target decoder to play a decoded video. One embodiment of the present disclosure provides a method for adaptively selecting a target decoder. Instead of directly using a default decoder to decode a target video, specified type information of a plurality of decoders is compared with target type information to select a target decoder that supports decoding of the target video, and the target video is decoded by using the target decoder, so that decoding failure can be avoided, thereby improving a success rate of video decoding, and further improving a success rate of video playing. Moreover, the method is not limited by the type of the target video, and any type of target video may be decoded by using the method provided in one embodiment of the present disclosure, so that the application scope is expanded.

Figure 5:
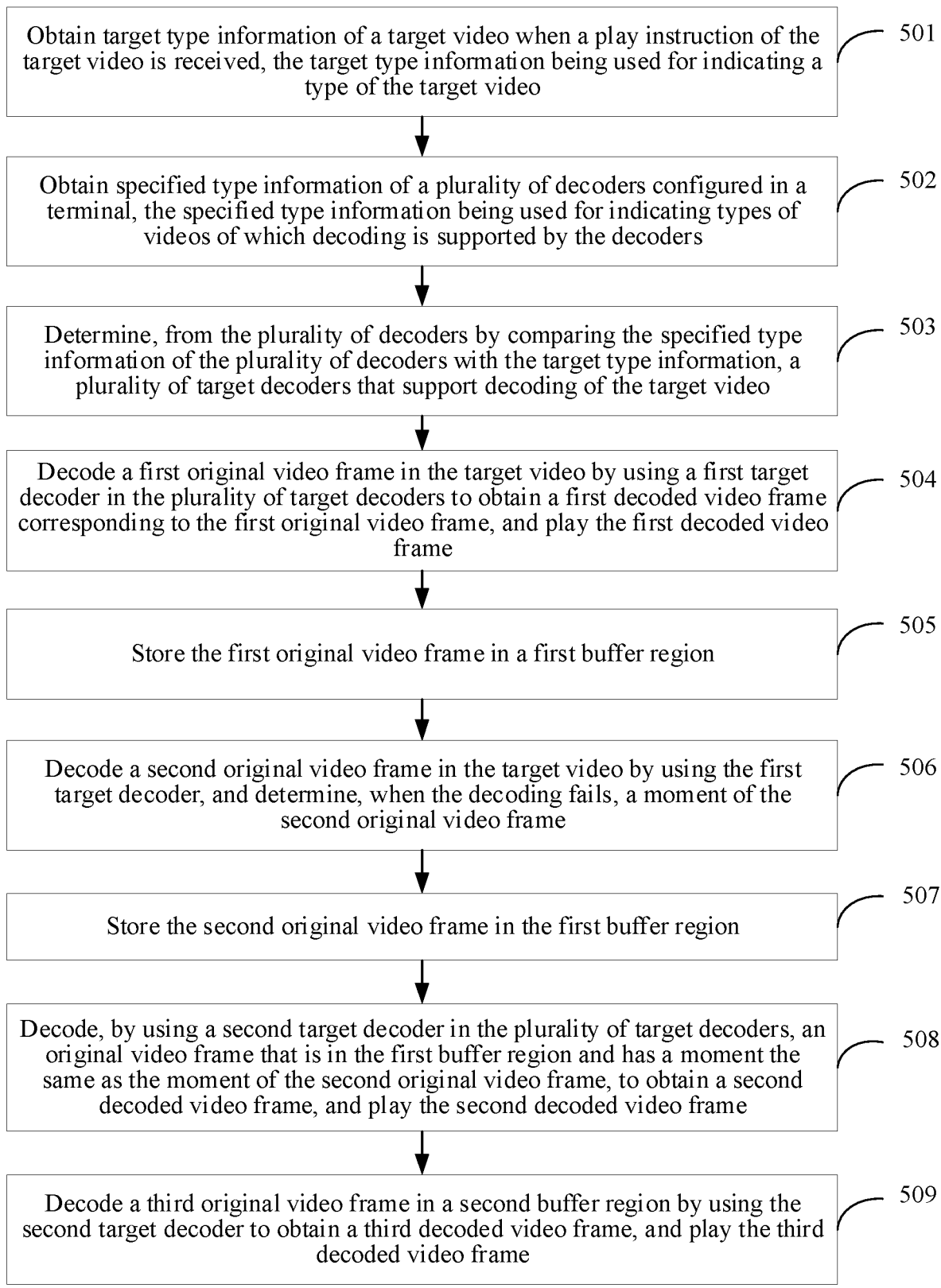
FIG. 5 is a flowchart of a video decoding method according to an embodiment of the present disclosure.

FIG. 5 is a flowchart of a video decoding method according to an embodiment of the present disclosure. The method is applied to a terminal. Referring to FIG. 5, the method includes the following steps:

501: Obtain target type information of a target video upon receiving a play instruction of the target video, the target type information indicating a type of the target video.

502: Obtain specified type information of a plurality of decoders configured in a terminal, the specified type information indicating types of videos of which decoding is supported by the decoders.

503: Determine, from the plurality of decoders by comparing the specified type information of the plurality of decoders with the target type information, a plurality of target decoders that support decoding of the target video.

A process of steps 501 to 503 is similar to that of steps 304 to 306, and details are not described herein again.

504: Decode a first original video frame in the target video by using a first target decoder in the plurality of target decoders to obtain a first decoded video frame corresponding to the first original video frame, and play the first decoded video frame.

If a plurality of target decoders that support decoding of the target video are determined from the plurality of decoders configured in the terminal, the first target decoder is selected from the plurality of target decoders, and the target video is decoded by using the first target decoder.

The first target decoder may be any target decoder randomly selected from the plurality of target decoders, or may be a target decoder with the highest priority in the plurality of target decoders, or may be a target decoder selected in another manner.

The target video includes a plurality of original video frames. In a process of decoding the target video by using the first target decoder, each original video frame in the target video is sequentially decoded. Therefore, a first original video frame is used as an example in one embodiment of the present disclosure, and the first original video frame is any original video frame in the target video. The terminal decodes the first original video frame by using the first target decoder to obtain a first decoded video frame corresponding to the first original video frame, and plays the first decoded video frame.

After the plurality of target decoders are determined from the plurality of decoders, the terminal stores the plurality of target decoders that support decoding of the target video. If the first target decoder fails to decode the target video, the terminal may switch from the first target decoder to another target decoder in the plurality of stored target decoders, and the target video continues to be decoded by using the another target decoder.

505: Store the first original video frame in a first buffer region.

The first buffer region is used for storing the original video frame in the target video. After decoding the first original video frame, the terminal stores the first original video frame in the first buffer region, so that the first original video frame can be found in the first buffer region subsequently.

506: Decode a second original video frame in the target video by using the first target decoder, and determine, when the decoding fails, a moment of the second original video frame.

507: Store the second original video frame in the first buffer region.

In some embodiments, the second original video frame may be any original video frame in the target video. In some embodiments, the second original video frame may be a next original video frame of the first original video frame in the target video. In some embodiments, when the decoding of the second original video frame by using the first target decoder succeeds, a decoded video frame corresponding to the second original video frame can be obtained, the second original video frame is stored in the first buffer region, and the decoded video frame is played.

In a process of decoding the second original video frame by using the first target decoder, the first target decoder decodes the second original video frame, but the decoding may fail. In this case, the decoding of the second original video frame fails, the decoded video frame corresponding to the second original video frame cannot be obtained, and the terminal cannot normally play the decoded video frame corresponding to the second original video frame.

For example, the decoding failure of the second original video frame by using the first target decoder may include the following cases:

1. Some files of the used first target decoder in the terminal are lost, and as a result the first target decoder fails to implement a decoding function.
2. Surface (a screen buffer region) is configured in the terminal. Surface is used for rendering a video frame after the terminal successfully decodes the video frame in the target video. When Surface needs to be updated, the decoding of the first target decoder is interrupted, and as a result decoding of the first target decoder fails.

To use another target decoder to decode the second original video frame, when the decoding failure of the second original video frame by using the first target decoder, the terminal determines a moment of the second original video frame and stores the second original video frame in the first buffer region, so that the second original video frame can be found in the first buffer region according to the moment.

508: Decode, by using a second target decoder in the plurality of target decoders, an original video frame that is in the first buffer region and has a moment the same as the moment of the second original video frame, to obtain a second decoded video frame, and play the second decoded video frame.

When the decoding by the first target decoder fails, the second target decoder is selected from the plurality of target decoders, and the corresponding original video frame is found in the first buffer region according to the moment of the decoding failure, the original video frame is the second original video frame of the decoding failure. Therefore, the second original video frame is decoded again by using the second target decoder to obtain the second decoded video frame, and the second decoded video frame is played, thereby implementing continuous decoding and continuous playing of the video frames. In a subsequent process, the second target decoder may continue to be used to decode original video frames following the second original video frame.

In one embodiment, when any video is encoded, if each video frame in the video is separately encoded, an amount of calculation is large, and a data volume of the encoded video is large, which cannot meet a compression requirement. Therefore, a solution for encoding with reference to adjacent video frames is provided. Some video frames in the video may be directly encoded, and for video frames following the directly encoded video frames, a difference between a video frame and an adjacent video frame may be obtained and encoded. Correspondingly, during decoding of the video, the directly encoded video frames may be directly decoded, and the video frames encoded with reference to adjacent video frames cannot be directly decoded, but the original video frames need to be restored according to the difference obtained after decoding and the adjacent video frames.

The directly encoded video frame is referred to as an I frame, the video frame encoded with reference to a previous video frame is referred to as a B frame, and the video frame encoded with reference to a previous video frame and a next video frame is referred to as a P frame. The I frame and the B frame and the P frame that follow the I frame form a group of pictures (GOP), that is, a video frame sequence.

Figure 6:
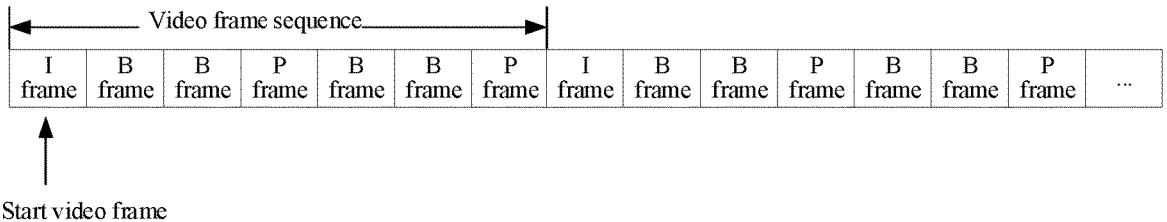
FIG. 6 is a schematic diagram of a video frame according to an embodiment of the present disclosure.

Therefore, in one embodiment of the present disclosure, as shown in FIG. 6, the target video may include at least one video frame sequence, each video frame sequence includes a start video frame (the I frame), and a quantity of video frames of the each video frame sequence is a preset quantity N (an example in which N is equal to 7 is merely used in FIG. 6). N is a sum of quantities of I frames and B frames and P frames that follow the I frames, and may be any value greater than or equal to 2, for example, 100, 120, or 150. That is, in the target video, a first video frame is used as a first start video frame, and the first start video frame and the following N−1 video frames form a first video frame sequence. A second start video frame and N−1 video frames following the second start video frame form a second video frame sequence, and the like.

If the B frame or the P frame in the target video is directly decoded, the decoding fails, and the target video cannot be normally played, resulting in a blurred screen. Therefore, during decoding, it is necessary to decode each video frame in the video frame sequence with the video frame sequence as a unit.

In one embodiment, any start video frame in the first buffer region is decoded by using the second target decoder to obtain a decoded video frame corresponding to the start video frame; the decoded video frame is discarded when a moment of the start video frame is different from the moment of the second original video frame; a next original video frame continues to be decoded; and a second decoded video frame corresponding to the original video frame is played when a moment of a currently decoded original video frame is the same as the moment of the second original video frame.

Figure 7:
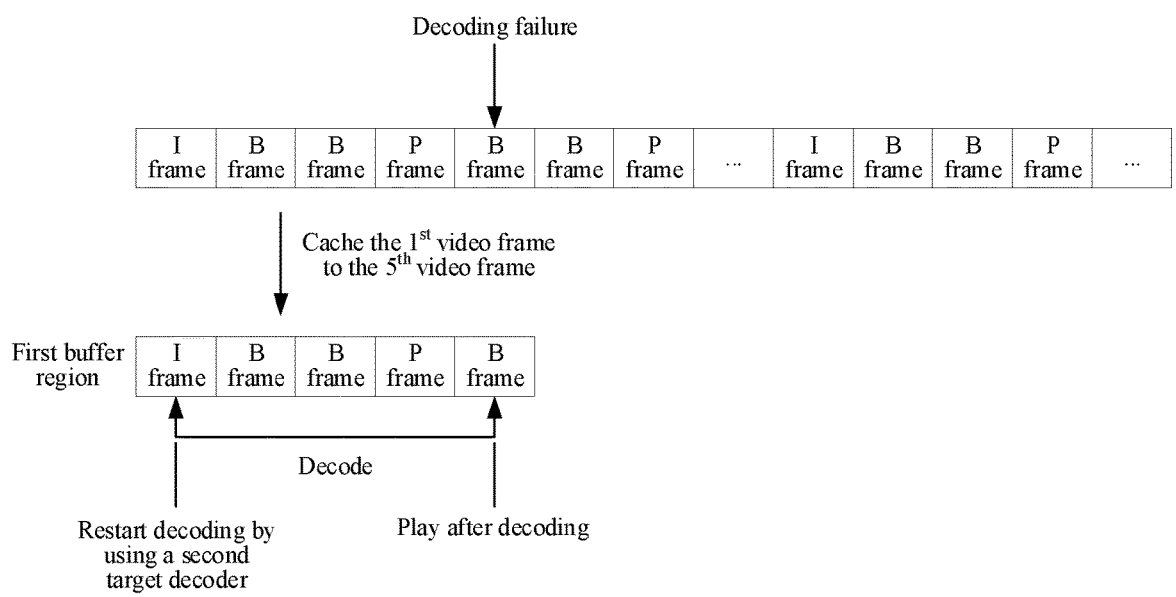
FIG. 7 is a schematic diagram of a video frame according to an embodiment of the present disclosure.

As shown in FIG. 7, the target video is formed by the I frame, the B frame, and the P frame. Four original video frames that are successfully decoded in the target video are stored in the first buffer region. If the $5^{th}$ original video frame (the B frame) fails to be decoded by using the first target decoder, the $5^{th}$ original video frame is also stored in the first buffer region, and switching is performed from the first target decoder to the second target decoder to sequentially decode the five original video frames stored in the first buffer region. Because the moments of the first four original video frames are different from the moment of the video frame of the decoding failure, the video frames obtained after decoding are discarded. When the $5^{th}$ original video frame is decoded, because the moment of the currently decoded video frame is the same as the moment of the video frame of the decoding failure, the video frame obtained after current decoding is the video frame obtained by decoding the $5^{th}$ original video frame, and the video frame obtained after decoding is played, which keeps the continuity of video playing.

Figure 8:
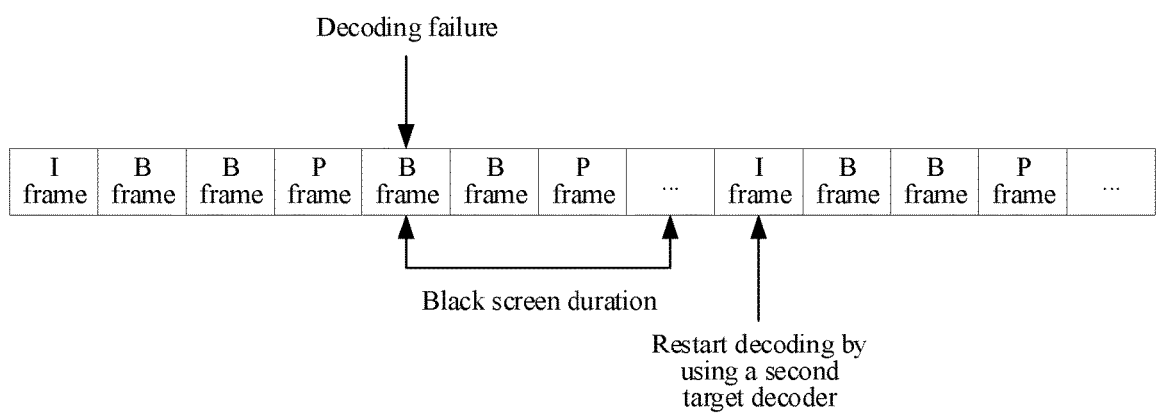
FIG. 8 is a schematic diagram of a black screen duration according to an embodiment of the present disclosure.

As shown in FIG. 8, when the $5^{th}$ original video frame fails to be decoded by using the first target decoder, if switching is directly performed from the first target decoder to the second target decoder, the second target decoder cannot continue to decode the $6^{th}$ original video frame, but needs to wait for a next start video frame before the next start video frame can be decoded. The video frame cannot be played during the waiting, and the terminal is in a black screen state. The black screen lasts for a long time, which severely affects a playing effect of the target video. For example, one video frame sequence includes 100 frames, and a duration of playing one video frame is 40 ms. If a start video frame in the video frame sequence fails to be decoded, the terminal has a black screen duration of 4 s, and the video cannot be played within the black screen duration.

In one embodiment of the present disclosure, an original video frame successfully decoded by a first target decoder is stored in a first buffer region, so that when decoding of a second original video frame fails subsequently, a second target decoder may decode a start video frame in the first buffer region without waiting for a next start video frame in the target video, thereby shortening a waiting time, preventing a terminal from entering a black screen state, and improving a playing effect of the target video.

In one embodiment of the present disclosure, an example in which any original video frame successfully decoded by the first target decoder is stored in the first buffer region is used for description. In another embodiment, to save a storage space as much as possible while ensuring a decoding effect and increase a decoding speed of the second target decoder, when decoding of any start video frame in the target video by using the first target decoder succeeds or fails, the start video frame is stored in the first buffer region. Moreover, because the original video frames stored in the first buffer region and the current start video frame belong to different video frame sequences, it is not necessary to perform decoding according to the original video frames stored in the first buffer region in subsequent decoding, so that these original video frames are deleted. The any start video frame is the first original video frame in any video frame sequence.

When decoding of any start video frame in the target video by using the first target decoder succeeds or fails, the start video frame is stored in the first buffer region, indicating that: any start video frame in the target video is decoded by using the first target decoder, after the decoding of the start video frame is completed, the start video frame is stored in the first buffer region, that is, after a decoding result is obtained, regardless of whether the decoding result is decoding success or decoding failure, the start video frame is stored in the first buffer region.

In some embodiments, when decoding of the original video frame in the target video by using the first target decoder succeeds or fails, it is determined whether the original video frame is the start video frame in any video frame sequence. If the original video frame is the start video frame in the video frame sequence, a stored original video frame in the first buffer region is deleted, and the original video frame is stored in the first buffer region. If the original video frame is not the start video frame in the video frame sequence, the original video frame is directly stored in the first buffer region.

509: Decode a third original video frame in a second buffer region by using the second target decoder to obtain a third decoded video frame, and play the third decoded video frame.

The third original video frame is a next original video frame of the second original video frame. The second buffer region is used for storing the target video.

After the second original video frame in the first buffer region is decoded by using the second target decoder, the third original video frame in the second buffer region continues to be decoded by using the second target decoder to obtain the third decoded video frame corresponding to the third original video frame, and the third decoded video frame is played. A next original video frame then continues to be decoded by using the second target decoder to obtain a decoded video frame corresponding to the next original video frame, and the decoded video frame is played. By analogy, continuous decoding and playing of the target video can be implemented.

One embodiment of the present disclosure may be applied to a playing application program installed in a terminal, and a setting interface in the playing application program includes a button for triggering the video decoding method provided in the embodiments of the present disclosure. By triggering the button, a user can control the terminal to use the video decoding method to decode a video.

There may be at least one target decoder that supports decoding of a target video determined in one embodiment of the present disclosure.

In one embodiment, if only one target decoder that supports decoding of the target video is determined, the target decoder may be used as the first target decoder, and each original video frame in the target video is sequentially decoded by using the first target decoder.

A first original video frame is used as an example, and the first original video frame is any original video frame in the target video. A process of sequentially decoding each original video frame in the target video by using the first target decoder may include the following: the terminal decodes the first original video frame by using the first target decoder to obtain a first decoded video frame corresponding to the first original video frame, plays the first decoded video frame, and stores the first decoded video frame in the first buffer region.

Subsequently, the first target decoder may continue to be used to decode original video frames following the first original video frame. A second original video frame is used as an example. When decoding of the second original video frame fails, the first target decoder is restarted and reused to decode the second original video frame.

If the first target decoder is used to decode the second original video frame, and the decoding of the first target decoder is interrupted due to the update of Surface, causing the decoding failure of the second original video frame, it is not necessary to switch to another decoder, but the first target decoder may be restarted and reused to decode the second original video frame.

A process of reusing the first target decoder for decoding is similar to a process of steps 508 and 509, and details are not described herein again.

In another embodiment, if a plurality of target decoders that support decoding of the target video are determined, any target decoder may be selected from the plurality of target decoders as the first target decoder, and each original video frame in the target video is sequentially decoded by using the first target decoder.

A first original video frame is used as an example, and the first original video frame is any original video frame in the target video. A process of sequentially decoding each original video frame in the target video by using the first target decoder may include the following: the terminal decodes the first original video frame by using the first target decoder to obtain a first decoded video frame corresponding to the first original video frame, plays the first decoded video frame, and stores the first decoded video frame in the first buffer region.

Subsequently, the first target decoder may continue to be used to decode original video frames following the first original video frame. A second original video frame is used as an example. When decoding of the second original video frame fails, the first target decoder may be restarted and reused to decode the second original video frame. Alternatively, switching may be performed from the first target decoder to the second target decoder to decode the second original video frame by using the foregoing steps 506 to 509.

In the method provided by one embodiment of the present disclosure, a plurality of target decoders that support decoding of a target video are selected from a plurality of decoders configured in a terminal, a first original video frame in the target video is decoded by using a first target decoder in the plurality of target decoders, a first decoded video frame after decoding is played, the first original video frame is stored in a first buffer region, and when a second original video frame fails to be decoded by using the first target decoder, the second original video frame is stored in the first buffer region, an original video frame that is in the first buffer region and has a moment the same as a moment of the second original video frame is decoded by using a second target decoder in the plurality of target decoders, a second decoded video frame after decoding is played, and an original video frame successfully decoded by a first target decoder is stored in a first buffer region, so that when decoding of a second original video frame fails subsequently, a second target decoder may decode a start video frame in the first buffer region without waiting for a next start video frame in the target video, thereby shortening a waiting time, preventing a terminal from entering a black screen state, and improving a playing effect of the target video.

Moreover, when decoding of any start video frame in the target video by using the first target decoder succeeds or fails, the start video frame is stored in the first buffer region. A storage space is saved as much as possible while ensuring a decoding effect, and a decoding speed of the second target decoder is increased.

Figure 9:
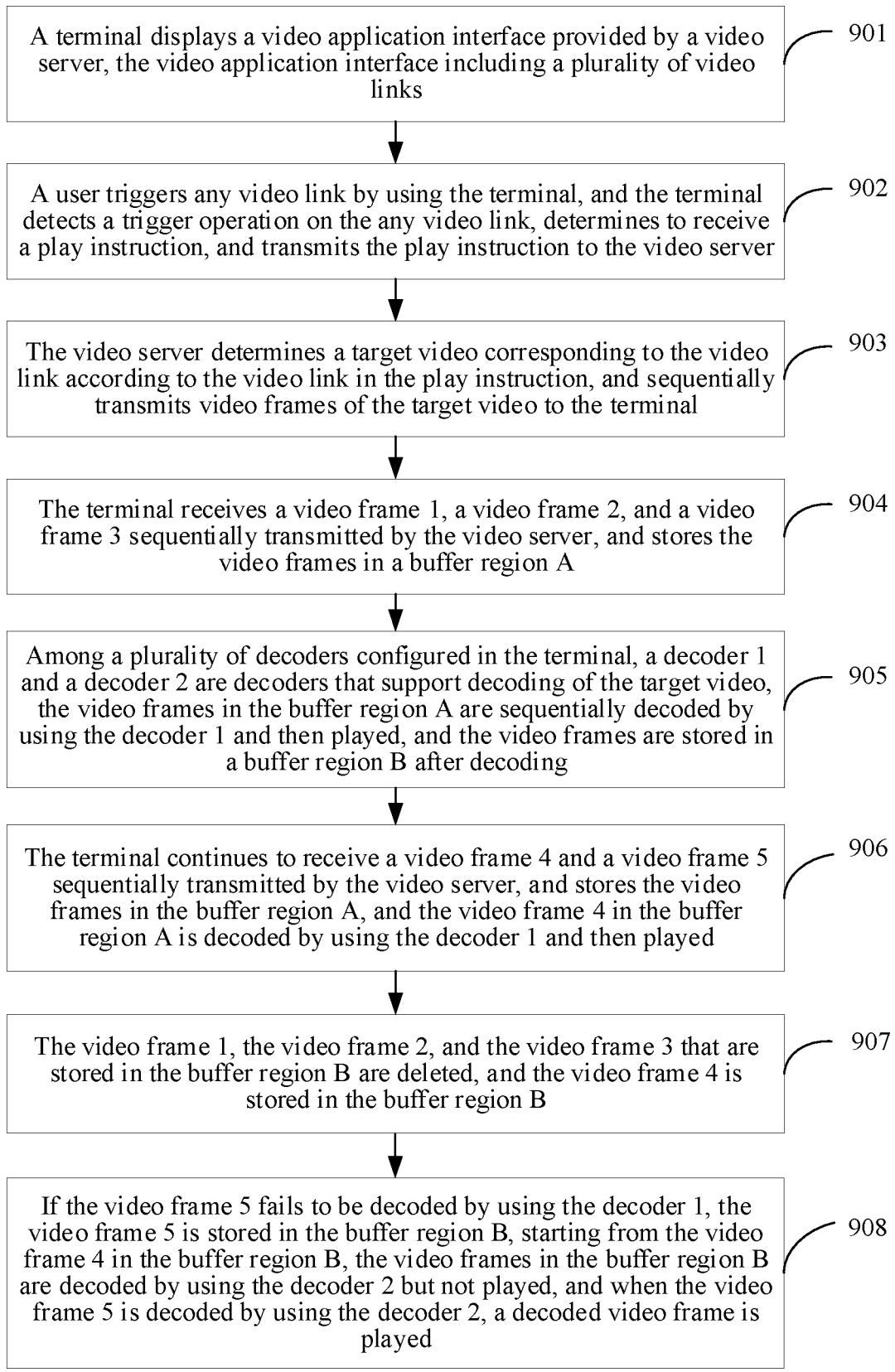
FIG. 9 is a flowchart of application of a video decoding method according to an embodiment of the present disclosure.

FIG. 9 is a flowchart of application of a video decoding method according to an embodiment of the present disclosure. A scenario of online video playing is used as an example for description, and the video decoding method includes the following steps:

901: A terminal displays a video application interface provided by a video server, the video application interface including a plurality of video links.

902: A user triggers any video link by using the terminal, and the terminal detects a trigger operation on the any video link, determines to receive a play instruction, and transmits the play instruction to the video server, the play instruction carrying the video link.

903: The video server determines a target video corresponding to the video link according to the video link in the play instruction, and sequentially transmits video frames of the target video to the terminal.

Figure 10:
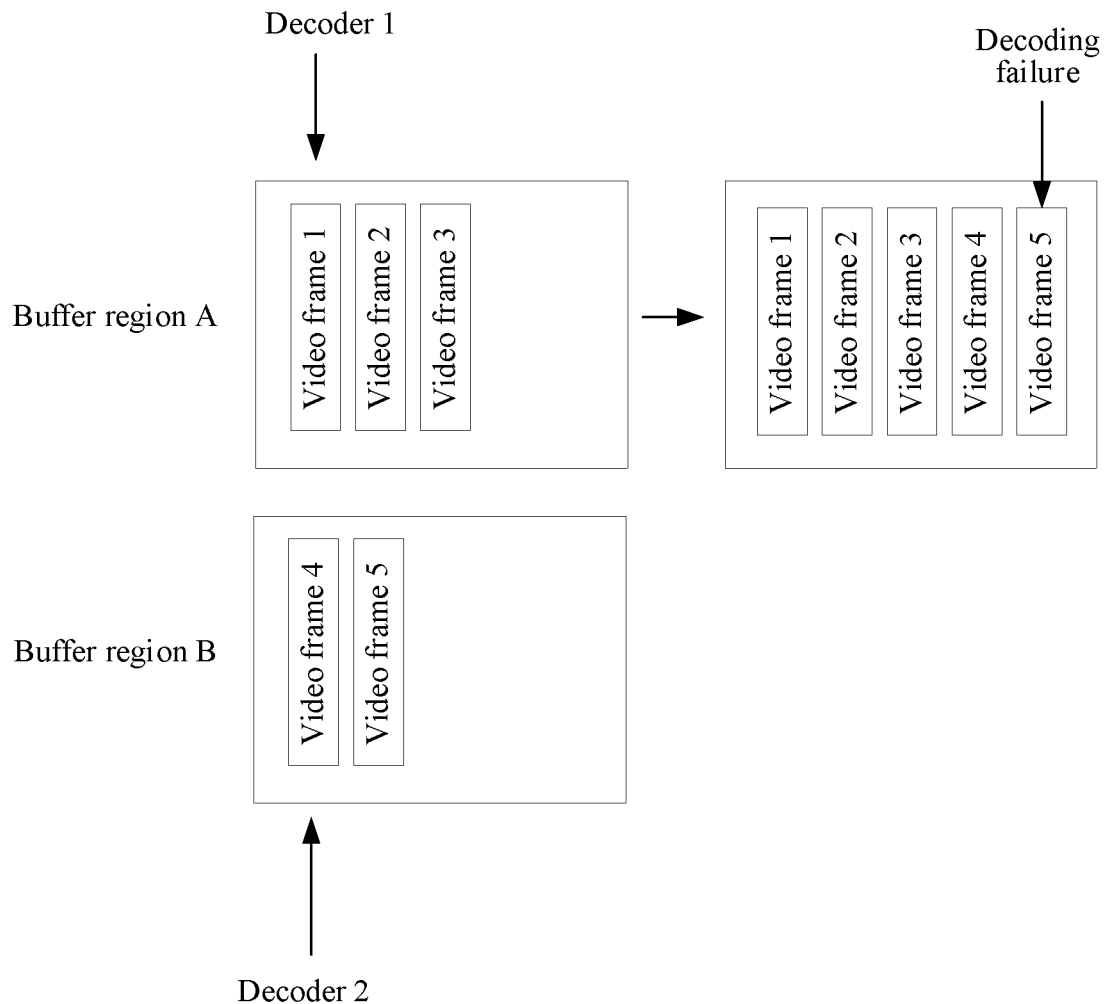
FIG. 10 is a schematic diagram of switching a target decoder according to an embodiment of the present disclosure.

904: As shown in FIG. 10, the terminal receives a video frame 1, a video frame 2, and a video frame 3 sequentially transmitted by the video server, and stores the video frames in a buffer region A.

905: Among a plurality of decoders configured in the terminal, a decoder 1 and a decoder 2 are decoders that support decoding of the target video, the video frames in the buffer region A are sequentially decoded by using the decoder 1 and then played, and the video frames are stored in a buffer region B after decoding.

906: As shown in FIG. 10, the terminal continues to receive a video frame 4 and a video frame 5 sequentially transmitted by the video server, and stores the video frames in the buffer region A, and the video frame 4 in the buffer region A is decoded by using the decoder 1 and then played.

907: Because the video frame 4 is a start video frame, the video frame 1, the video frame 2, and the video frame 3 that are stored in the buffer region B are deleted, and the video frame 4 is stored in the buffer region B.

908: If the video frame 5 fails to be decoded by using the decoder 1, the video frame 5 is stored in the buffer region B, starting from the video frame 4 in the buffer region B, the video frames in the buffer region B are decoded by using the decoder 2 but not played, and when the video frame 5 is decoded by using the decoder 2, a decoded video frame is played.

Figure 11:
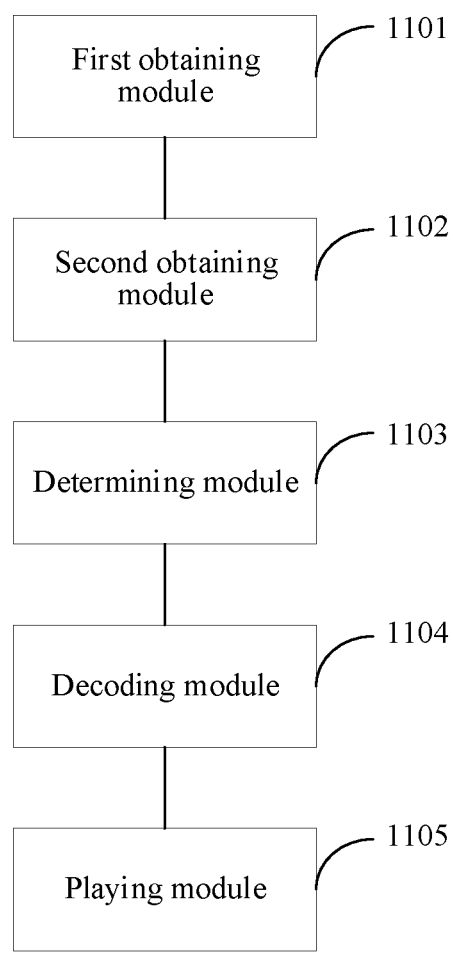
FIG. 11 is a schematic structural diagram of a video decoding apparatus according to an embodiment of the present disclosure.

FIG. 11 is a schematic structural diagram of a video decoding apparatus according to an embodiment of the present disclosure. Referring to FIG. 11, the apparatus includes:

a first obtaining module 1101, configured to obtain target type information of a target video upon receiving a play instruction of the target video, the target type information indicating a type of the target video; a second obtaining module 1102, configured to obtain specified type information of a plurality of decoders configured in a terminal, the specified type information of the decoders indicating types of videos of which decoding is supported by the decoders; a determining module 1103, configured to determine, from the plurality of decoders by comparing the specified type information of the plurality of decoders with the target type information, a target decoder that supports decoding of the target video; a decoding module 1104, configured to decode the target video by using the target decoder; and a playing module 1105, configured to play a decoded video.

In the video decoding apparatus provided by one embodiment of the present disclosure, target type information of a target video and specified type information of a plurality of decoders configured in a terminal (e.g., the video decoding apparatus) are obtained, the target type information is used for indicating a type of the target video, the specified type information is used for indicating types of videos of which decoding is supported by the decoders, a target decoder that supports decoding of the target video is determined from the plurality of decoders by comparing the specified type information of the plurality of decoders with the target type information, and the target video is decoded by using the target decoder to play a decoded video. One embodiment of the present disclosure provides a method for adaptively selecting a target decoder. Instead of directly using a default decoder to decode a target video, specified type information of a plurality of decoders is compared with target type information to select a target decoder that supports decoding of the target video, and the target video is decoded by using the target decoder, so that decoding failure can be avoided, thereby improving a success rate of video decoding, and further improving a success rate of video playing. Moreover, the method is not limited by the type of the target video, and any type of target video may be decoded by using the method provided in one embodiment of the present disclosure, so that the application scope is expanded.

Figure 12:
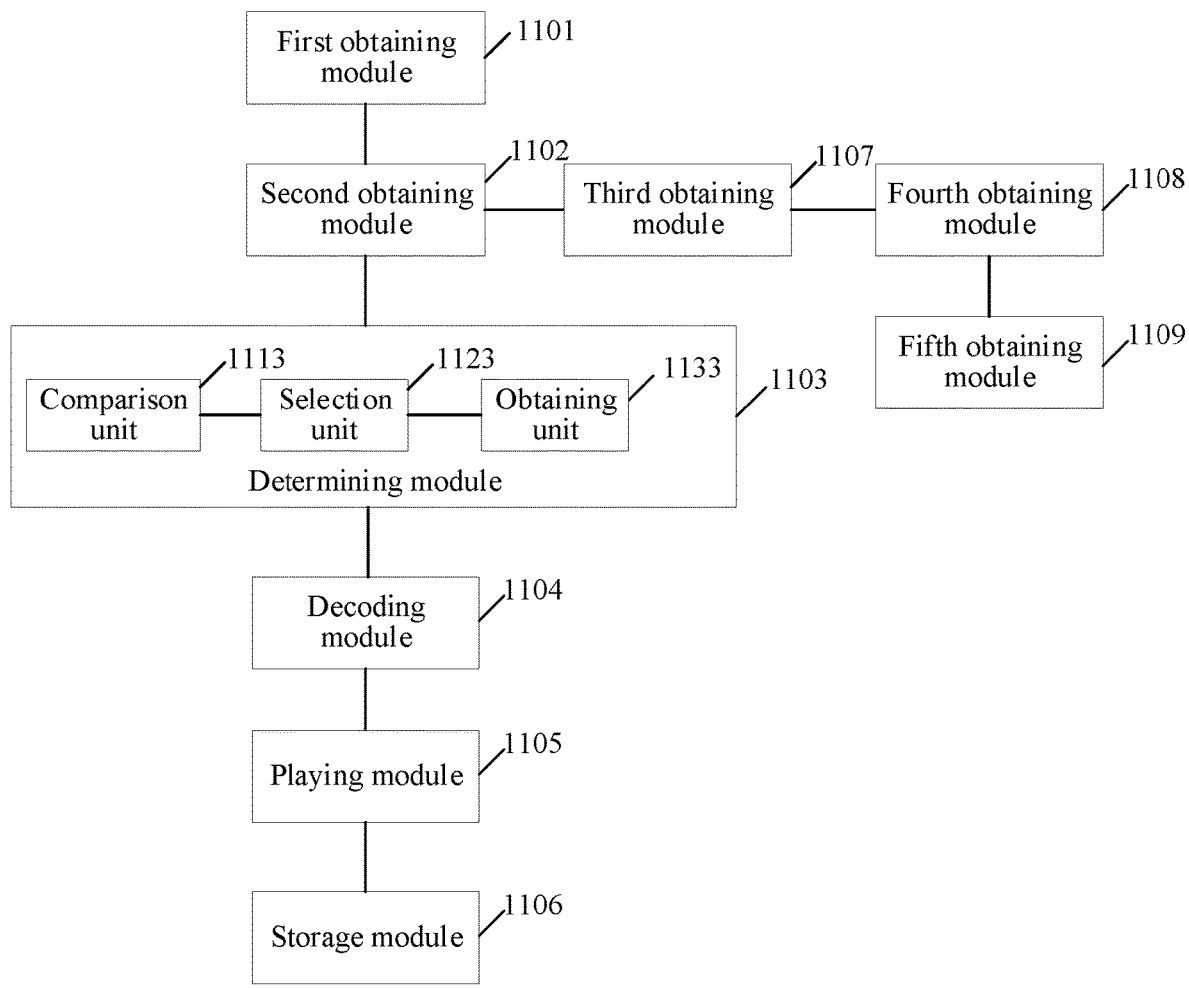
FIG. 12 is a schematic structural diagram of another video decoding apparatus according to an embodiment of the present disclosure.

In one embodiment, referring to FIG. 12, the target video includes a plurality of original video frames, and the apparatus further includes a storage module 1106; the decoding module 1104 is further configured to decode, when at least one target decoder that supports decoding of the target video is determined, a first original video frame by using a first target decoder in the at least one target decoder to obtain a first decoded video frame corresponding to the first original video frame, the first original video frame being any original video frame in the target video; the playing module 1105 is further configured to play the first decoded video frame; and the storage module 1106 is further configured to store the first original video frame in a first buffer region.

In another embodiment, the target video includes a plurality of original video frames, and the apparatus further includes a storage module 1106; the decoding module 1104 is further configured to decode, when a plurality of target decoders that support decoding of the target video are determined, a second original video frame by using a first target decoder in the plurality of target decoders; the determining module 1103 is further configured to determine, when the decoding by the decoding module fails, a moment of the second original video frame, the second original video frame being any original video frame in the target video; the storage module 1106 is further configured to store the second original video frame in the first buffer region; the decoding module 1104 is further configured to decode, by using a second target decoder in the plurality of target decoders, an original video frame that is in the first buffer region and has a moment the same as the moment of the second original video frame, to obtain a second decoded video frame; and the playing module 1105 is further configured to play the second decoded video frame.

In another embodiment, the target video includes at least one video frame sequence, each video frame sequence includes a start video frame, and a quantity of video frames of the each video frame sequence is a preset quantity; and the storage module 1106 is further configured to, when decoding of any start video frame in the target video by using the first target decoder succeeds or fails, delete a stored original video frame in the first buffer region, and store the start video frame in the first buffer region.

In another embodiment, the target video includes at least one video frame sequence, each video frame sequence includes a start video frame, and a quantity of video frames of the each video frame sequence is a preset quantity; and the decoding module 1104 is further configured to: decode any start video frame in the first buffer region by using the second target decoder to obtain a decoded video frame corresponding to the start video frame; discard the decoded video frame when a moment of the start video frame is different from the moment of the second original video frame; and continue to decode a next original video frame to obtain a corresponding decoded video frame, and trigger, when a moment of a currently decoded original video frame is the same as the moment of the second original video frame, the playing module to play a second decoded video frame corresponding to the original video frame.

In another embodiment, the decoding module 1104 is further configured to decode a third original video frame in a second buffer region by using the second target decoder to obtain a third decoded video frame; and the playing module 1105 is further configured to play the third decoded video frame, the second buffer region being used for storing the target video, the third original video frame being an original video frame at a next moment of the moment of the second original video frame.

In another embodiment, referring to FIG. 12, the apparatus further includes: a third obtaining module 1107, configured to obtain a historical decoding record, the historical decoding record including at least one decoding record entry, each decoding record entry including type information of a decoded video and a correspondence between a decoder that decodes the video and a decoding result, the decoding result including decoding success or decoding failure; a fourth obtaining module 1108, configured to obtain, for each decoder from the historical decoding record, a decoding record entry that includes the decoder and in which an included decoding result is decoding success; and a fifth obtaining module 1109, configured to obtain specified type information of the decoder according to type information in the obtained decoding record entry.

In another embodiment, referring to FIG. 12, the apparatus further includes: a third obtaining module 1107, configured to obtain a historical playing record, the historical playing record including at least one playing record entry, each playing record entry including type information of a played video and a correspondence between a decoder that decodes the video before playing and a playing result, the playing result including playing success or playing failure; a fourth obtaining module 1108, configured to obtain, for each decoder from the historical playing record, a playing record entry that includes the decoder and in which an included playing result is playing success; and a fifth obtaining module 1109, configured to obtain the specified type information of the decoder according to type information in the obtained playing record entry.

In another embodiment, referring to FIG. 12, the determining module 1103 includes: a comparison unit 1113, configured to determine, from the plurality of decoders by comparing the specified type information of the plurality of decoders with the target type information, a plurality of target decoders that support decoding of the target video; and a selection unit 1123, configured to select a target decoder with the highest priority from the plurality of target decoders according to priorities of the plurality of target decoders.

In another embodiment, referring to FIG. 12, the determining module 1103 includes: an obtaining unit 1133, configured to obtain a level of a user identifier currently logged in; a selection unit 1123, configured to select, from the plurality of decoders, a plurality of decoders matching the level; and a comparison unit 1113, configured to determine the target decoder by comparing the specified type information of the plurality of decoders matching the level with the target type information.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

All the optional technical solutions above may be combined in different manners to form other embodiments of the present disclosure. Details are not described herein again.

The video decoding apparatus provided in the foregoing embodiments is merely illustrated with an example of division of the foregoing functional modules during video decoding. In actual application, the functions may be allocated to and completed by different functional modules according to requirements, that is, the internal structure of the terminal is divided into different functional modules, to implement all or some of the functions described above. In addition, the video decoding apparatus and method embodiments provided in the foregoing embodiments belong to one conception. For the specific implementation process, reference may be made to the method embodiments, and details are not described herein again.

Figure 13:
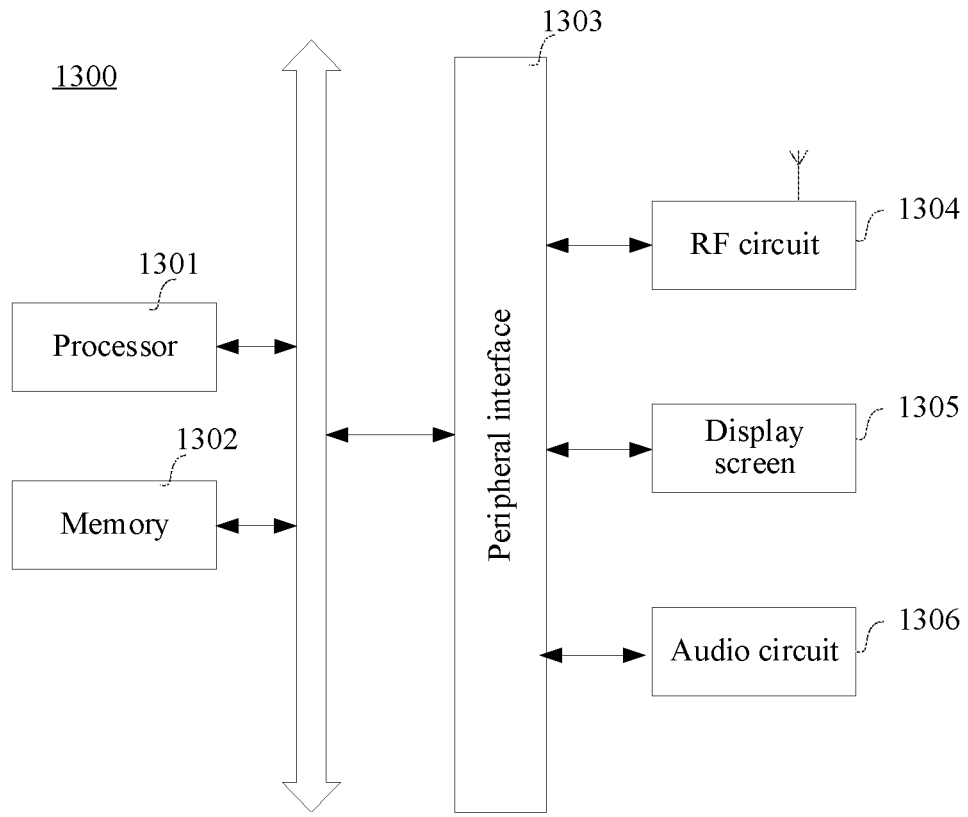
FIG. 13 is a schematic structural diagram of a terminal according to an embodiment of the present disclosure.

FIG. 13 is a schematic structural diagram of a terminal according to an embodiment of the present disclosure. The terminal 1300 may be an electronic device such as a smartphone, a tablet computer, an MP3 player, an MP4 player, a notebook computer, a desktop computer, a head-mounted device, or any smart terminal.

Generally, the terminal 1300 includes a processor 1301 and a memory 1302.

The processor 1301 may include one or more processing cores, for example, a 4-core processor or an 8-core processor. The memory 1302 may include one or more computer-readable storage media that may be non-transitory. The memory 1302 may further include a high-speed random access memory and a non-volatile memory. In some embodiments, the non-transitory computer-readable storage medium in the memory 1302 is configured to store at least one instruction, and the at least one instruction is used for being executed by the processor 1301 to implement the video decoding method provided by the method embodiments in the present disclosure.

In some embodiments, the terminal 1300 may alternatively include: a peripheral interface 1303 and at least one peripheral. The processor 1301, the memory 1302, and the peripheral interface 1303 may be connected through a bus or a signal cable. Each peripheral may be connected to the peripheral interface 1303 through a bus, a signal cable, or a circuit board. Specifically, the peripheral includes: at least one of a radio frequency (RF) circuit 1304, a display screen 1305, and an audio circuit 1306.

The peripheral interface 1303 may be configured to connect at least one peripheral related to input/output (I/O) to the processor 1301 and the memory 1302.

The RF circuit 1304 is configured to receive and transmit an RF signal, communicates with a communication network or with another communication device, and converts an electrical signal into an electromagnetic signal for transmission, or converts a received electromagnetic signal into an electrical signal.

The display screen 1305 is configured to display a user interface (UI). The UI may include a graph, a text, an icon, a video, and any combination thereof. When the display screen 1305 is a touch display screen, the display screen 1305 is further capable of acquiring a touch signal on or above a surface of the display screen 1305. The touch signal may be inputted, as a control signal, to the processor 1301 for processing.

The audio circuit 1306 may include a microphone and a speaker. The speaker is configured to acquire sound waves of a user and an environment, and convert the sound waves into electrical signals and input the electrical signals into the processor 1301 for processing, or input the electrical signals into the RF circuit 1304 to implement speech communication.

A person skilled in the art can understand that the structure shown in FIG. 13 does not constitute the limitation to the terminal 1300, more or fewer assemblies may be included as compared with the figure, some assemblies may be combined, or different assemblies may be adopted for arrangement.

Figure 14:
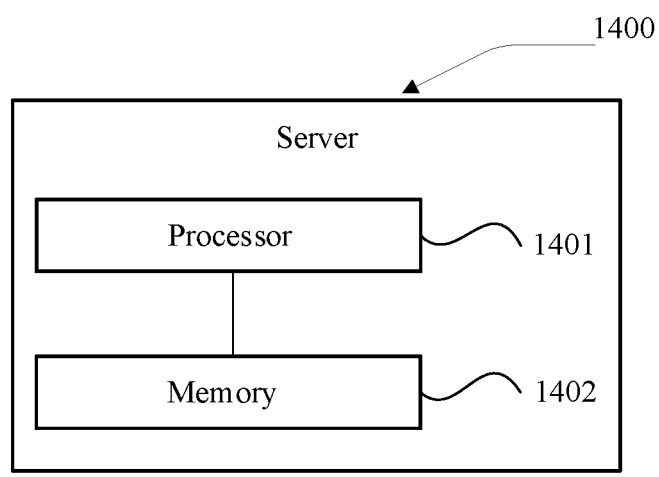
FIG. 14 is a schematic structural diagram of a server according to an embodiment of the present disclosure.

FIG. 14 is a schematic structural diagram of a server according to an embodiment of the present disclosure. The server 1400 may vary greatly due to different configurations or performance, and may include one or more processors (for example, CPUs) 1401 and one or more memories 1402. The memory 1402 stores at least one instruction, and the at least one instruction is loaded and executed by the processor 1401 to implement the methods provided in the foregoing method embodiments. Certainly, the server may have a wired or wireless network interface, a keyboard, an I/O interface, and other components to facilitate I/O. The server may further include other components for implementing device functions. Details are not described herein again.

The server 1400 may be configured to perform the steps performed by the server in the foregoing video decoding method.

An embodiment of the present disclosure further provides a computer device. The computer device includes a processor and a memory. The memory stores at least one instruction, at least one program, a code set, or an instruction set. The instruction, the program, the code set, or the instruction set is loaded by the processor to implement the following operations: obtaining target type information of a target video upon receiving a play instruction of the target video, the target type information indicating a type of the target video; obtaining specified type information of a plurality of decoders configured in a terminal, the specified type information of the decoders indicating types of videos of which decoding is supported by the decoders; determining, from the plurality of decoders by comparing the specified type information of the plurality of decoders with the target type information, a target decoder that supports decoding of the target video; and decoding the target video by using the target decoder to play a decoded video.

In one embodiment, the target video includes a plurality of original video frames, and the instruction, the program, the code set, or the instruction set is loaded by the processor to implement the following operations: decoding, when at least one target decoder that supports decoding of the target video is determined, a first original video frame by using a first target decoder in the at least one target decoder to obtain a first decoded video frame corresponding to the first original video frame, the first original video frame being any original video frame in the target video; and playing the first decoded video frame, and storing the first original video frame in a first buffer region.

In one embodiment, the target video includes a plurality of original video frames, and the instruction, the program, the code set, or the instruction set is loaded by the processor to implement the following operations: decoding, when a plurality of target decoders that support decoding of the target video are determined, a second original video frame by using a first target decoder in the plurality of target decoders, and determining, when the decoding fails, a moment of the second original video frame, the second original video frame being any original video frame in the target video; storing the second original video frame in the first buffer region; and decoding, by using a second target decoder in the plurality of target decoders, an original video frame that is in the first buffer region and has a moment the same as the moment of the second original video frame, to obtain a second decoded video frame, and playing the second decoded video frame.

In one embodiment, the target video includes at least one video frame sequence, each video frame sequence includes a start video frame, and a quantity of video frames of the each video frame sequence is a preset quantity; and the instruction, the program, the code set, or the instruction set is loaded by the processor to implement the following operations: when decoding of any start video frame in the target video by using the first target decoder succeeds or fails, deleting a stored original video frame in the first buffer region, and storing the start video frame in the first buffer region.

In one embodiment, the target video includes at least one video frame sequence, each video frame sequence includes a start video frame, and a quantity of video frames of the each video frame sequence is a preset quantity; and the instruction, the program, the code set, or the instruction set is loaded by the processor to implement the following operations: decoding any start video frame in the first buffer region by using the second target decoder to obtain a decoded video frame corresponding to the start video frame; discarding the decoded video frame when a moment of the start video frame is different from the moment of the second original video frame; and continuing to decode a next original video frame to obtain a corresponding decoded video frame, and playing, when a moment of a currently decoded original video frame is the same as the moment of the second original video frame, a second decoded video frame corresponding to the original video frame.

In one embodiment, the instruction, the program, the code set, or the instruction set is loaded by the processor to implement the following operations: decoding a third original video frame in a second buffer region by using the second target decoder to obtain a third decoded video frame, and playing the third decoded video frame, the second buffer region being used for storing the target video, the third original video frame being an original video frame at a next moment of the moment of the second original video frame.

In one embodiment, the instruction, the program, the code set, or the instruction set is loaded by the processor to implement the following operations: obtaining a historical decoding record, the historical decoding record including at least one decoding record entry, each decoding record entry including type information of a decoded video and a correspondence between a decoder that decodes the video and a decoding result, the decoding result including decoding success or decoding failure; obtaining, for each decoder from the historical decoding record, a decoding record entry that includes the decoder and in which an included decoding result is decoding success; and obtaining specified type information of the decoder according to type information in the obtained decoding record entry.

In one embodiment, the instruction, the program, the code set, or the instruction set is loaded by the processor to implement the following operations: obtaining a historical playing record, the historical playing record including at least one playing record entry, each playing record entry including type information of a played video and a correspondence between a decoder that decodes the video before playing and a playing result, the playing result including playing success or playing failure; obtaining, for each decoder from the historical playing record, a playing record entry that includes the decoder and in which an included playing result is playing success; and obtaining the specified type information of the decoder according to type information in the obtained playing record entry.

In one embodiment, the instruction, the program, the code set, or the instruction set is loaded by the processor to implement the following operations: determining, from the plurality of decoders by comparing the specified type information of the plurality of decoders with the target type information, a plurality of target decoders that support decoding of the target video; and selecting a target decoder with the highest priority from the plurality of target decoders according to priorities of the plurality of target decoders.

In one embodiment, the instruction, the program, the code set, or the instruction set is loaded by the processor to implement the following operations: obtaining a level of a user identifier currently logged in; selecting, from the plurality of decoders, a plurality of decoders matching the level; and determining the target decoder by comparing the specified type information of the plurality of decoders matching the level with the target type information.

An embodiment of the present disclosure further provides a computer-readable storage medium. The computer-readable storage medium stores at least one instruction, at least one program, a code set, or an instruction set. The instruction, the program, the code set, or the instruction set is loaded by the processor to implement the following operations: obtaining target type information of a target video upon receiving a play instruction of the target video, the target type information indicating a type of the target video; obtaining specified type information of a plurality of decoders configured in a terminal, the specified type information of the decoders indicating types of videos of which decoding is supported by the decoders; determining, from the plurality of decoders by comparing the specified type information of the plurality of decoders with the target type information, a target decoder that supports decoding of the target video; and decoding the target video by using the target decoder to play a decoded video.

In one embodiment, the target video includes a plurality of original video frames, and the instruction, the program, the code set, or the instruction set is loaded by the processor to implement the following operations: decoding, when at least one target decoder that supports decoding of the target video is determined, a first original video frame by using a first target decoder in the at least one target decoder to obtain a first decoded video frame corresponding to the first original video frame, the first original video frame being any original video frame in the target video; and playing the first decoded video frame, and storing the first original video frame in a first buffer region.

In one embodiment, the target video includes a plurality of original video frames, and the instruction, the program, the code set, or the instruction set is loaded by the processor to implement the following operations: decoding, when a plurality of target decoders that support decoding of the target video are determined, a second original video frame by using a first target decoder in the plurality of target decoders, and determining, when the decoding fails, a moment of the second original video frame, the second original video frame being any original video frame in the target video; storing the second original video frame in the first buffer region; and decoding, by using a second target decoder in the plurality of target decoders, an original video frame that is in the first buffer region and has a moment the same as the moment of the second original video frame, to obtain a second decoded video frame, and playing the second decoded video frame.

In one embodiment, the target video includes at least one video frame sequence, each video frame sequence includes a start video frame, and a quantity of video frames of the each video frame sequence is a preset quantity; and the instruction, the program, the code set, or the instruction set is loaded by the processor to implement the following operations: when decoding of any start video frame in the target video by using the first target decoder succeeds or fails, deleting a stored original video frame in the first buffer region, and storing the start video frame in the first buffer region.

In one embodiment, the target video includes at least one video frame sequence, each video frame sequence includes a start video frame, and a quantity of video frames of the each video frame sequence is a preset quantity; and the instruction, the program, the code set, or the instruction set is loaded by the processor to implement the following operations: decoding any start video frame in the first buffer region by using the second target decoder to obtain a decoded video frame corresponding to the start video frame; discarding the decoded video frame when a moment of the start video frame is different from the moment of the second original video frame; and continuing to decode a next original video frame to obtain a corresponding decoded video frame, and playing, when a moment of a currently decoded original video frame is the same as the moment of the second original video frame, a second decoded video frame corresponding to the original video frame.

In one embodiment, the instruction, the program, the code set, or the instruction set is loaded by the processor to implement the following operations: decoding a third original video frame in a second buffer region by using the second target decoder to obtain a third decoded video frame, and playing the third decoded video frame, the second buffer region being used for storing the target video, the third original video frame being an original video frame at a next moment of the moment of the second original video frame.

In one embodiment, the instruction, the program, the code set, or the instruction set is loaded by the processor to implement the following operations: obtaining a historical decoding record, the historical decoding record including at least one decoding record entry, each decoding record entry including type information of a decoded video and a correspondence between a decoder that decodes the video and a decoding result, the decoding result including decoding success or decoding failure; obtaining, for each decoder from the historical decoding record, a decoding record entry that includes the decoder and in which an included decoding result is decoding success; and obtaining specified type information of the decoder according to type information in the obtained decoding record entry.

In one embodiment, the instruction, the program, the code set, or the instruction set is loaded by the processor to implement the following operations: obtaining a historical playing record, the historical playing record including at least one playing record entry, each playing record entry including type information of a played video and a correspondence between a decoder that decodes the video before playing and a playing result, the playing result including playing success or playing failure; obtaining, for each decoder from the historical playing record, a playing record entry that includes the decoder and in which an included playing result is playing success; and obtaining the specified type information of the decoder according to type information in the obtained playing record entry.

In one embodiment, the instruction, the program, the code set, or the instruction set is loaded by the processor to implement the following operations: determining, from the plurality of decoders by comparing the specified type information of the plurality of decoders with the target type information, a plurality of target decoders that support decoding of the target video; and selecting a target decoder with the highest priority from the plurality of target decoders according to priorities of the plurality of target decoders.

In one embodiment, the instruction, the program, the code set, or the instruction set is loaded by the processor to implement the following operations: obtaining a level of a user identifier currently logged in; selecting, from the plurality of decoders, a plurality of decoders matching the level; and determining the target decoder by comparing the specified type information of the plurality of decoders matching the level with the target type information.

A person of ordinary skill in the art may understand that all or some of the steps of the foregoing embodiments may be implemented by hardware, or may be implemented by a program instructing related hardware. The program may be stored in a computer-readable storage medium. The storage medium may be a Read Only Memory (ROM), a magnetic disk, or an optical disc.

The foregoing descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A video decoding method, applied to a computer device, the method comprising:
   obtaining target type information of a target video upon receiving a play instruction of the target video, the target type information indicating a type of the target video;
   obtaining specified type information of a plurality of decoders configured in a terminal, the specified type information of the decoders indicating types of videos of which decoding is supported by the decoders;
   determining, from the plurality of decoders by comparing the specified type information of the plurality of decoders with the target type information, a target decoder that supports decoding of the target video, the target decoder including a first target decoder and a second target decoder; and
   decoding the target video by using the target decoder to play a decoded video, comprising: decoding a target original video frame by using the first target decoder, the target original video frame being one of a plurality of original video frames comprised in the target video; and in response to determining that the decoding of the target original video frame by the first target decoder fails:
     determining a moment of the target original video frame;
     storing the target original video frame in a first buffer region; and
     decoding, by using the second target decoder, an original video frame that is in the first buffer region and has a moment the same as the moment of the target original video frame, to obtain a target decoded video frame, and playing the target decoded video frame.

2. The method according to claim 1, wherein the target video comprises a plurality of original video frames, and the decoding the target video by using the target decoder to play a decoded video comprises:
   decoding, when at least one target decoder that supports decoding of the target video is determined, a first original video frame by using the first target decoder to obtain a first decoded video frame corresponding to the first original video frame, the first original video frame being any original video frame in the target video; and playing the first decoded video frame, and storing the first original video frame in the first buffer region.

3. The method according to claim 1, wherein the target video comprises at least one video frame sequence, each video frame sequence comprises a start video frame; and the method further comprises:
   when decoding of any start video frame in the target video by using the first target decoder succeeds or fails, deleting a stored original video frame in the first buffer region, and storing the start video frame in the first buffer region.

4. The method according to claim 1, wherein the target video comprises at least one video frame sequence, each video frame sequence comprises a start video frame; and the decoding, by using the second target decoder, an original video frame that is in the first buffer region and has a moment the same as the moment of the target original video frame, to obtain a target decoded video frame, and playing the target decoded video frame comprises:
   decoding any start video frame in the first buffer region by using the second target decoder to obtain a decoded video frame corresponding to the start video frame;
   discarding the decoded video frame when a moment of the start video frame is different from the moment of the target original video frame; and
   continuing to decode a next original video frame to obtain a corresponding decoded video frame, and playing, when a moment of a currently decoded original video frame is the same as the moment of the second original video frame, a second decoded video frame corresponding to the original video frame.

5. The method according to claim 1, wherein the method further comprises:
   decoding a third original video frame in a second buffer region by using the second target decoder to obtain a third decoded video frame, and playing the third decoded video frame, the second buffer region being configured to store the target video, the third original video frame being an original video frame at a next moment of the moment of the target original video frame.

6. The method according to claim 1, wherein before the obtaining specified type information of a plurality of decoders configured in a terminal, the method further comprises:
   obtaining a historical decoding record, the historical decoding record comprising at least one decoding record entry, each decoding record entry comprising type information of a decoded video and a correspondence between a decoder that decodes the video and a decoding result, the decoding result comprising decoding success or decoding failure;
   obtaining, for each decoder from the historical decoding record, a decoding record entry that comprises the decoder and in which a comprised decoding result is decoding success; and
   obtaining the specified type information of the decoder according to type information in the obtained decoding record entry.

7. The method according to claim 1, wherein before the obtaining specified type information of a plurality of decoders configured in a terminal, the method further comprises:
   obtaining a historical playing record, the historical playing record comprising at least one playing record entry, each playing record entry comprising type information of a played video and a correspondence between a decoder that decodes the video before playing and a playing result, the playing result being one of playing success and playing failure;

obtaining, for each decoder from the historical playing record, a playing record entry indicating a decoder and a playing result corresponding to the decoder being playing success; and obtaining the specified type information of the decoder according to type information in the obtained playing record entry.

8. The method according to claim 1, wherein the determining, from the plurality of decoders by comparing the specified type information of the plurality of decoders with the target type information, a target decoder that supports decoding of the target video comprises:

determining, from the plurality of decoders by comparing the specified type information of the plurality of decoders with the target type information, a plurality of candidate target decoders that support decoding of the target video; and selecting a target decoder with the highest priority from the plurality of candidate target decoders according to priorities of the plurality of candidate target decoders.

9. The method according to claim 1, wherein the determining, from the plurality of decoders by comparing the specified type information of the plurality of decoders with the target type information, a target decoder that supports decoding of the target video comprises:

obtaining a level of a user identifier, wherein the user identifier uniquely identifies a user that is currently logged in, and a level of the user identifier corresponds to a decoding capability;

selecting, from the plurality of decoders, a plurality of candidate target decoders matching the level; and determining the target decoder by comparing the specified type information of the plurality of candidate target decoders matching the level with the target type information.

10. A computer device, comprising at least one processor and at least one memory, the at least one memory storing computer instructions, the computer instructions, when loaded by the at least one processor, implement operations comprising:

obtaining target type information of a target video upon receiving a play instruction of the target video, the target type information indicating a type of the target video;

obtaining specified type information of a plurality of decoders configured in a terminal, the specified type information of the decoders indicating types of videos of which decoding is supported by the decoders;

determining, from the plurality of decoders by comparing the specified type information of the plurality of decoders with the target type information, a target decoder that supports decoding of the target video, the target decoder including a first target decoder and a second target decoder; and decoding the target video by using the target decoder to play a decoded video, comprising: decoding a target original video frame by using the first target decoder, the target original video frame being one of a plurality of original video frames comprised in the target video; and in response to determining that the decoding of the target original video frame by the first target decoder fails:

determining a moment of the target original video frame;

storing the target original video frame in a first buffer region; and decoding, by using the second target decoder, an original video frame that is in the first buffer region and has a moment the same as the moment of the target original video frame, to obtain a target decoded video frame, and playing the target decoded video frame.

11. The computer device according to claim 10, wherein the target video comprises a plurality of original video frames, and the computer instructions are loaded by the at least one processor to implement:

decoding, when at least one target decoder that supports decoding of the target video is determined, a first original video frame by using the first target decoder to obtain a first decoded video frame corresponding to the first original video frame, the first original video frame being any original video frame in the target video; and playing the first decoded video frame, and storing the first original video frame in the first buffer region.

12. The computer device according to claim 10, wherein the target video comprises at least one video frame sequence, each video frame sequence comprises a start video frame; and computer instructions are loaded by the at least one processor to implement:

when decoding of any start video frame in the target video by using the first target decoder succeeds or fails, deleting a stored original video frame in the first buffer region, and storing the start video frame in the first buffer region.

13. The computer device according to claim 10, wherein the target video comprises at least one video frame sequence, each video frame sequence comprises a start video frame; and the computer instructions are loaded by the at least one processor to implement:

decoding any start video frame in the first buffer region by using the second target decoder to obtain a decoded video frame corresponding to the start video frame;

discarding the decoded video frame when a moment of the start video frame is different from the moment of the target original video frame; and continuing to decode a next original video frame to obtain a corresponding decoded video frame, and playing, when a moment of a currently decoded original video frame is the same as the moment of the second original video frame, a second decoded video frame corresponding to the original video frame.

14. The computer device according to claim 10, wherein t the computer instructions are loaded by the at least one processor to implement:

decoding a third original video frame in a second buffer region by using the second target decoder to obtain a third decoded video frame, and playing the third decoded video frame, the second buffer region being configured to store the target video, the third original video frame being an original video frame at a next moment of the moment of the target original video frame.

15. The computer device according to claim 10, wherein the computer instructions are loaded by the at least one processor to implement:

obtaining a historical decoding record, the historical decoding record comprising at least one decoding record entry, each decoding record entry comprising type information of a decoded video and a correspondence between a decoder that decodes the video and a decoding result, the decoding result comprising decoding success or decoding failure;

obtaining, for each decoder from the historical decoding record, a decoding record entry that comprises the decoder and in which a comprised decoding result is decoding success; and obtaining the specified type information of the decoder according to type information in the obtained decoding record entry.

16. The computer device according to claim 10, wherein the computer instructions are loaded by the at least one processor to implement:

obtaining a historical playing record, the historical playing record comprising at least one playing record entry, each playing record entry comprising type information of a played video and a correspondence between a decoder that decodes the video before playing and a playing result, the playing result being one of playing success and playing failure;

obtaining, for each decoder from the historical playing record, a playing record entry indicating a decoder and a playing result corresponding to the decoder being playing success; and obtaining the specified type information of the decoder according to type information in the obtained playing record entry.

17. The computer device according to claim 10, wherein the computer instructions are loaded by the at least one processor to implement:

determining, from the plurality of decoders by comparing the specified type information of the plurality of decoders with the target type information, a plurality of candidate target decoders that support decoding of the target video; and selecting a target decoder with the highest priority from the plurality of candidate target decoders according to priorities of the plurality of candidate target decoders.

18. A non-transitory computer-readable storage medium, storing computer instructions, the computer instructions, when executed by a processor, implement operations comprising:

obtaining target type information of a target video upon receiving a play instruction of the target video, the target type information indicating a type of the target video;

obtaining specified type information of a plurality of decoders configured in a terminal, the specified type information of the decoders indicating types of videos of which decoding is supported by the decoders;

determining, from the plurality of decoders by comparing the specified type information of the plurality of decoders with the target type information, a target decoder that supports decoding of the target video, the target decoder including a first target decoder and a second target decoder; and decoding the target video by using the target decoder to play a decoded video, comprising: decoding a target original video frame by using the first target decoder, the target original video frame being one of a plurality of original video frames comprised in the target video; and in response to determining that the decoding of the target original video frame by the first target decoder fails:

determining a moment of the target original video frame;

storing the target original video frame in a first buffer region; and decoding, by using the second target decoder, an original video frame that is in the first buffer region and has a moment the same as the moment of the target original video frame, to obtain a target decoded video frame, and playing the target decoded video frame.

* * * * *